United States Patent [19]

Zvonar

[11] Patent Number: 5,548,535
[45] Date of Patent: Aug. 20, 1996

[54] MONITOR UTILITY FOR USE IN MANUFACTURING ENVIRONMENT

[75] Inventor: John G. Zvonar, Austin, Tex.

[73] Assignee: Advanced Micro Devices, Inc., Austin, Tex.

[21] Appl. No.: 335,994

[22] Filed: Nov. 8, 1994

[51] Int. Cl.$^6$ .............................. G07C 3/00; G08B 21/00; G08B 23/00

[52] U.S. Cl. ..................... 364/551.01; 340/679; 364/569; 377/16

[58] Field of Search ................................ 340/457.4, 679; 364/550, 551.01, 569; 377/15, 16

[56] References Cited

U.S. PATENT DOCUMENTS

| | | | |
|---|---|---|---|
| 3,237,448 | 3/1966 | Howell et al. | 364/569 X |
| 3,546,693 | 12/1970 | Bissett et al. | 340/457.4 X |
| 4,346,446 | 8/1982 | Erbstein et al. | 364/551.01 |
| 4,404,641 | 9/1983 | Bazarnik | 364/569 |
| 4,539,632 | 9/1985 | Hansen et al. | 364/569 X |
| 4,612,623 | 9/1986 | Bazarnik | 364/569 |
| 4,739,482 | 4/1988 | Wrigge | 364/569 X |
| 4,884,054 | 11/1989 | Moon, Sr. | 340/457.4 X |
| 5,216,612 | 6/1993 | Cornett et al. | 364/401 |
| 5,231,594 | 7/1993 | Knibiehler et al. | 377/15 X |
| 5,246,643 | 9/1993 | Inaba et al. | 264/40.1 |
| 5,408,224 | 4/1995 | Yamazaki et al. | 340/679 |
| 5,416,725 | 5/1995 | Pacheco et al. | 364/550 X |
| 5,428,547 | 6/1995 | Ikeda | 364/474.16 |

Primary Examiner—Edward R. Cosimano
Attorney, Agent, or Firm—Haynes and Boone, L.L.P.

[57] ABSTRACT

Method and apparatus for a utility for monitoring, tracking and scheduling the performance of periodic activities in a manufacturing environment is disclosed. In a preferred embodiment, the monitor utility of present invention is a VAX-based menu-driven program that is used to schedule and track periodic activities. erformed on tools and machines, or "entities." In one aspect of the invention, a user may create a family of entities to be monitored and may schedule various monitor items to be performed in connection with each entity, which items may be "triggered" by the occurrence of a designated event a designated number of times or by the elapse of a designated period of time. In another aspect of the invention, the utility may be used easily to generate and display and/or print reports in various formats showing the status of monitor items for a particular family and/or entity. In another aspect of the invention, the utility is capable of sending one or more VAX mail messages to designated users when certain monitor items are due. In addition, the utility may be configured to send a VAX mail warning message to designated users a predetermined amount of time before a monitor item becomes due so that the recipient(s) can take steps to perform the monitor item by the due date. In yet another aspect of the invention, if a monitor item is not performed by the due date, the utility is capable of logging down the entity with which the overdue monitor item is associated.

30 Claims, 18 Drawing Sheets

Monitor Tracking Utility
================================================================================
Group Change 05/25/94 15:29:55

Enter new SEA family or TABLE name: FURNACE

Note :
Use the UP & DOWN arrow keys to locate selection then press the ENTER key.

SFK1 = EXIT      SFK2 = HELP     SFK4 = NEXT PAGE    SFK6 = PREV PAGE  } 300
SFK5 = REFRESH   SFK7 = SPEC     RETURN = PROCESS
--------------------------------------------------------------------------------

| | | |
|---|---|---|
| 1 | FURNACE | Monitor Tracking Utility |
| 2 | ================================================================================ | |
| 3 | | Comets Access 02/03/93 10:33:01 |
| 4 | | |
| 5 | | |
| 6 | | |
| 7 | | |
| 8 | | |
| 9 | | |
| 10 | Select the Workstream data group source : No Workstream link | |
| 11–21 | | |
| 22 | SFK1 = EXIT     SFK2 = HELP    SFK4 = NEXT PAGE    SFK6 = PREV PAGE | |
| 23 | SFK5 = REFRESH  SFK7 = SPEC    RETURN = PROCESS | |

*FIG. 4*

FURNACE —502       Monitor Tracking Utility        ,—500
===============================================================================
                    Main Menu  05/25/94  14:59:21
                              FAB14 —504

[1] Status Page

[2] Enter Data

[3] Schedule

[4] Monitor Items

[5] Report

[6] Change Group

[7] Exit

SFK1 = EXIT      SFK2 = HELP    RETURN = PROCESS
------------------------------------------------------------

*FIG. 5*

```
         502                                                    600
    ┌─────┴──────────────────────────────────────────────────────┴──┐
    │ FURNACE          Monitor Tracking Utility                     │
    │ ============================================================  │
    │                Monitor Page  02/02/93  14:59:06               │
    │                         FAB14 —504                            │
    │         Monitor              In                               │
    │    ADU   Item       Input  Status  Use  Spec No.   Comments   │
    │         604   606        608   610         612         616    │
    │ 602  —   .........  ......   .    ...........  ............. │
    │      —   .........  ......   .    ...........  ............. │
    │      —   .........  ......   .    ...........  ............. │
    │      —   .........  ......   .    ...........  ............. │
    │      —   .........  ......   .    ...........  ............. │
    │      —   .........  ......   .    ...........  ............. │
    │      —   .........  ......   .    ...........  ............. │
    │      —   .........  ......   .    ...........  ............. │
    │      .                                                        │
    │                                                               │
    │  SFK1 = EXIT      SFK2 = HELP    SFK4 = NEXT PAGE   SFK6 = PREV PAGE │
    │  SFK5 = REFRESH   SFK7 = SPEC    RETURN = PROCESS             │
    └───────────────────────────────────────────────────────────────┘
```

*FIG. 6A*

FURNACE —502            Monitor Tracking Utility
================================================================================
                     Monitor Page  05/25/94  15:26:32
                              FAB14 ─504

Monitor                    In
ADU   Item         Input  Status Use   Spec No.   Comments _   Shiftly Chkl  Both    0    Yes   07_2304    Shiftly Checklist
  _   Weekly TCA    Both    0    Yes   07_2301    Weekly TCA Clean
  _   TCA Idle >24  Both    0    Yes   07_2301    Run a TCA Clean if Idle>24hrs
  _   TCA 10 Runs   Both    6    Yes   07_2301    Run TCA Clean after 10 Runs
  _   Tunnel Test   Both    0    Yes   07_2301    Run Tunnel Test if > 2 weeks
  _   Tube Change   Both    7    Yes   07_2255    Oxidation Tube Change
  _   TC Change     Both    0    Yes   07_2261    Profile TC Change
  _   POC13 Source  Both    0    Yes   07_2332    POC13 Source if Idle>24hrs
  _   Drain Tray    Both    8    Yes   07_2332    Drain POC13 Drip Tray
  _   Furn Tube 40  Both    6    Yes   07_2255    POC13/Drive Tube Change SFK1 = EXIT       SFK2 = HELP    SFK4 = NEXT PAGE    SFK6 = PREV PAGE
SFK5 = REFRESH    SFK7 = SPEC    RETURN = PROCESS
--------------------------------------------------------------------------------

*FIG. 6B*

FURNACE —502            Monitor Tracking Utility
================================================================================
                     Entity Name  06/21/94  06:45:47

Enter Entity name: ................

SFK1 = EXIT       SFK2 = HELP    SFK4 = NEXT PAGE    SFK6 = PREV PAGE
SFK5 = REFRESH    SFK7 = SPEC    RETURN = PROCESS
--------------------------------------------------------------------------------
                              *FIG. 7*

FURNACE /502          Monitor Tracking Utility          1000

================================================================================
                    Status Page 05/25/94 14:58:40
                              FAB14
                                /~1002

| Entity    | Status | Entity    | Status | Entity    | Status | Entity    | Status |
|-----------|--------|-----------|--------|-----------|--------|-----------|--------|
| FURN A1.. | ok     | FURN D1.. | ok     | FURN G1.. | ok *   | FURN J1.. | ok     |
| FURN A2.. | ok     | FURN D2.. | ok     | FURN G2.. | ok     | FURN J2.. | ok *   |
| FURN A3.. | DUE    | FURN D3.. | ok     | FURN G3.. | ok *   | FURN J3.. | ok     |
| FURN A4.. | WARN   | FURN D4.. | DUE    | FURN G4.. | ok *   | FURN J4.. | ok     |
| FURN B1.. | ok     | FURN E1.. | ok     | FURN H1.. | ok     | FURN K1.. | ok     |
| FURN B2.. | DUE    | FURN E2.. | ok     | FURN H2.. | ok     | FURN K2.. | ok     |
| FURN B3.. | ok     | FURN E3.. | ok     | FURN H3.. | DUE    | FURN K3.. | ok *   |
| FURN B4.. | Warn   | FURN E4.. | ok     | FURN H4.. | ok     | FURN K4.. | ok *   |
| FURN C1.. | ok     | FURN F1.. | ok     | FURN I1.. | ok     | FURN L1.. | ok *   |
| FURN C2.. | ok     | FURN F2.. | Warn   | FURN I2.. | ok     | FURN L2.. | ok *   |
| FURN C3.. | ok     | FURN F3.. | DUE    | FURN I3.. | ok     | FURN L3.. | ok     |
| FURN C4.. | ok     | FURN F4.. | DUE    | FURN I4.. | ok     | FURN L4.. | ok     |

1002b 1002a  6.15% of all items are Due ←~1004

SFK1 = EXIT       SFK2 = HELP      SFK4 = NEXT PAGE     SFK6 = PREV PAGE
SFK5 = REFRESH    SFK7 = SPEC      RETURN = PROCESS

*FIG. 10*

FURNACE /502          Monitor Tracking Utility          1100

================================================================================
                    Entity Page 1 05/25/94 14:58:58
                              FURN A3

| Item Monitored | Due or Est due Date/Time | Intervals Remaining | Last log Event | Last Done Date/Time |
|----------------|--------------------------|---------------------|----------------|---------------------|
| >Inspex        | 06/07/1994 00:16:00      | 12 Days             | INSPEX LOAD    | 05/24/1994 00:16:00 |
| CV Test        | 05/27/1994 07:00:00      | 1  Days             | FURN BEG RUN   | 05/13/1994 07:00:00 |
| BV Test        | 05/29/1994 22:24:00      | 4  Days             | BV DATA        | 05/15/1994 22:24:00 |
| Profile        | 05/25/1994 11:48:00      | 0  Days             | FURN PROFILE   | 05/10/1994 11:48:00 |
| SPV Test       | 10/10/1993 15:30:00*     | 1  Month            | SPV RUN        | 10/10/1993 15:30:00 |

SFK1 = EXIT       SFK2 = HELP      SFK4 = NEXT PAGE     SFK6 = PREV PAGE
SFK5 = VIEW SCH   SFK7 = SPEC      SFK8 = VIEW CMNT     RETURN = PROCESS

*FIG. 11*

```
FURNACE—502            Monitor Tracking Utility              ←—1200
================================================================================
                    Spec View 05/25/94 16:21:01
                        07_4211AZ.TXT;1 (1)
\ SECTION "TITLE:  INSPEX MONITOR and OPERATION PSPEC"
      SPEC ID 07_4211

\ SECTION "1.0  PURPOSE"

To provide instructions to operate the Inspex EX3000,
      Inspex EX200 Patterned Wafer defect inspection system,
      and to define procedures to monitor defects using the Inspex
      in Fab XIV.

\ SECTION "2.0  SCOPE"

This spec covers the operation of the Inspex EX3000 and

SFK1 = EXIT  SFK2 = HELP  SFK3 = BOTTOM  SFK4 = NEXT PAGE  SFK6 = PREV PAGE
SFK5 = BACK  SFK7 = SPEC  SFK9 = TOP  RETURN = Search for _____
--------------------------------------------------------------------------------
```

FIG. 12

```
FURNACE—502            Monitor Tracking Utility              ←—1300
================================================================================
                    Spec View 05/25/94 16:21:01
                        07_4211AZ.TXT;1 (1)
      4.4  Nitride Strip, 07_4503.

4.5  Nitride Deposition, 07_4694.

4.6  NVLSDENSE Deposition, 07_4435.

4.7  Statistical Process Control, 07_4214.

4.8  CS9A Lam Etch, 07_4550.

4.9  SSI  Coaters, 07_4574

4.10 SVGC Coaters, 07_4680

SFK1 = EXIT  SFK2 = HELP  SFK3 = BOTTOM  SFK4 = NEXT PAGE  SFK6 = PREV PAGE
SFK5 = BACK  SFK7 = SPEC  SFK9 = TOP  RETURN = Search for _____
--------------------------------------------------------------------------------
```

FIG. 13

FURNACE —502          Monitor Tracking Utility
================================================================================

Entity Page 2  05/25/94 14:59:03
FURN A3

Status               Value

> AVAILABILITY         UP
     CURRENT_EVENT       FURN BEG RUN
     PARTICLE_STATUS     0
     FURNACE_CYCLE       134
     LAST_C/V_DATE       5/10/94         ←—1400
     SPC_1                0
     Last Event D/T      5/09/94 14:24:34

SFK1 = EXIT    SFK2 = HELP   SFK9 = NEXT ENTITY   SFK3 = PREV ENTITY
SFK5 = REFRESH  SFK7 = STATUS SUMMARY    RETURN = Enter Entity _____

*FIG. 14*

FURNACE —502          Monitor Tracking Utility
================================================================================

Status Summary  05/25/94 14:59:10
AVAILABILITY

| Entity | Status | Entity | Status |
|---|---|---|---|
| FURN A1...... | UP | FURN D1...... | UP |
| FURN A2...... | DOWN | FURN D2...... | UP |
| FURN A3...... | UP | FURN D3...... | UP |
| FURN A4...... | UP | FURN D4...... | UP |
| FURN B1...... | UP | FURN E1...... | DOWN |
| FURN B2...... | UP | FURN E2...... | UP |
| FURN B3...... | UP | FURN E3...... | UP |
| FURN B4...... | DOWN | FURN E4...... | UP |
| FURN C1...... | UP | FURN F1...... | UP |
| FURN C2...... | UP | FURN F2...... | UP |
| FURN C3...... | UP | FURN F3...... | UP |
| FURN C4...... | UP | FURN F4...... | DOWN |

SFK1 = EXIT     SFK2 = HELP   SFK4 = NEXT PAGE   SFK6 = PREV PAGE
                                      SFK9 = NEXT STATUS  SFK3 = PREV STATUS

*FIG. 15* enttable:furnace$ent
evntable:furnace$evn

[ACCESS]
user : JZVONAR      :ESMCADU:        ⎫
user : CPURSLEY     :ESMU             ⎬ 1802
                                      ⎭

[RLVN]
key : COMMENT                         } 1804

[NFMB]
statln1      :0:20:10:0:Process_Status
statln2      :0:20:10:0:Status_Owner
statln3      :0:14:5:0:Availability
statln4      :0:19:12:0:Current_Event
statln5      :0:37:10:1:Particle_Status
statln6      :0:55:6:1:Furnace_Cycle
statln7      :0:73:12:3:Last_C/V_Date
statln8      :0:91:2:1:SPC_1
statln9      :0:90:2:1:SPC_2 lnsze        :127                                  ⎬ 1806
entity       :0:1:12:0
evnt         :0:19:12:0
date         :0:109:17:4
inquiry      :3:4:5:6:7:8:0:0:0:
update       : OFF
nfmbon       : 0
nfmbname     :DT

[NTC]
LNSZE        :591
ENTITY       :0:6:12:0
DATE         :0:18:6:5
TIME         :0:24:6:6:
EVNT         :0:114:12:0
STATLN1      :0:209:12:0:Process_Status
STATLN2      :0:221:12:0:Status_Owner    ⎬ 1808
STATLN3      :0:233:12:0:Availability
STATLN4      :0:245:12:0:Current_Event
STATLN5      :0:257:12:1:Particle_Status
STATLN6      :0:269:12:1:Furnace_Cycle
STATLN7      :0:281:12:3:Last_C/V_Date
STATLN8      :0:293:12:1:SPC_1
STATLN9      :0:305:12:1:SPC_2

*FIG. 18A*

```
[LOG]
dir        :sea$monitor:
ext        :.log
file       :FURNACE_LOG
add        :on
delete     :on
update     :on
user       :on
ws         :on
```
} 1810

```
[SPEC]
dir        :comets$spec
ext        :.TXT
key        :07_
key        :05_
```
} 1812

```
[UNIT]
shft       :720
```
} 1814

```
[DBUG]
value      :0
```
} 1816

```
[HELP]
dir        :SEA$MONITOR:
file       :monitor
ext        :.HLP
```
} 1818

```
[CHILD]
dir        :SEA$MONITOR:
ext        :.EXE
file       :ZNFMB_CHILD
```
} 1820

```
[DEQUE]
value      :1
```
} 1822

```
[SORT]
value      :5
```
} 1824

```
[DUE]
times : NAG
dir : COMETS$MAIL:
bonly : 1
entity : 1
mail : ALL:0600:1730:jzvonar,@test.dis
evnt : MONITOR DWN
nagging : MON STIL DUE
```
} 1826

```
[WARN]
mail : WED:0000:2400:@alist.dis
```
} 1828

*FIG. 18B*

MONITOR UTILITY FOR USE IN MANUFACTURING ENVIRONMENT

TECHNICAL FIELD

The invention relates generally to manufacturing execution systems and, more particularly, to a monitor tracking utility for use in monitoring, tracking and scheduling performance of periodic activities in a manufacturing environment.

BACKGROUND OF THE INVENTION

Efficient management of a facility for manufacturing products such as semiconductor chips and the like requires the monitoring of all aspects of the manufacturing process. For example, it is typically necessary to track the amount of raw materials on hand, the status of work-in-process and the status and availability of machines and tools at every step in the process. Moreover, with regard to machines and tools used in the manufacturing process, it will often be necessary to schedule routine preventative maintenance (PM) procedures, as well as other diagnostic and reconditioning procedures that must be performed on a regular basis, such that the performance of the procedures does not impede the manufacturing process itself.

It is well known that PM procedures must be performed on a regular basis for several reasons. Clearly, PM assists in maintaining high production levels by helping to keep machines and tools in good working order. Moreover, keeping machines and tools in good condition assists in product quality control by ensuring that products will be manufactured to specification. In addition, with regard to semiconductor fabrication facilities, maintenance of International Standards Organization (ISO) certification requires that a manufacturer perform such procedures and then be able to substantiate such performance. For these reasons and others, it is imperative accurately to schedule and perform PM and other procedures.

One approach to achieving the foregoing objectives has been to implement in a manufacturing facility a "Management Execution System," or "MES," such as the WORKSTREAM factory management system developed by and available from Consilium, Inc. of Mountain View, Calif. WORKSTREAM enables s user to view and manipulate, to a limited extent, the status of machines and tools, or "entities," in a manufacturing environment. In addition, WORKSTREAM enables the tracking of products through the manufacturing process to enable resources to be managed in the most efficient manner. Specifically, in response to WORKSTREAM prompts, a user inputs requested information regarding work-in-process and entity status. For example, when a user performs PM on a particular entity, the operator logs the performance of the PM (an "event") into a WORKSTREAM database to update the information stored in the database with respect to the status of that entity. Alternatively, if an entity is to be put down for repair or maintenance, the operator will log this information into the WORKSTREAM database, which then prevents use of the entity until it is subsequently logged back up.

Although WORKSTREAM and similar MESs are sufficient for certain narrow purposes, such as determining the current status of a particular entity, such systems suffer several deficiencies, the most obvious of which is their lack of effective scheduling and reporting capabilities. For example, while WORKSTREAM enables a user to update the database with new information regarding the status of a particular entity, it does not allow the operator easily to generate and view a report of all scheduled maintenance for that entity over a particular time period. Moreover, WORKSTREAM is incapable of warning the operator of upcoming scheduled maintenance procedures and of notifying the operator when such procedures are overdue. Accordingly, in an unmodified WORKSTREAM environment, a user is not easily able to prearrange an appropriate day and time to perform scheduled maintenance procedures that coincides with production schedules.

Another deficiency of WORKSTREAM is that events must be logged within a predefined window of time around the scheduled due date to be appropriately accounted for. For example, assuming a procedure, such as PM, is due to be performed on an entity every thirty days, WORKSTREAM might permit the event to be logged during a three-day window beginning the day before and ending the day after the thirtieth day. If the event is logged outside of that window, either earlier or later, subsequent scheduling will be disrupted. In particular, the item will be scheduled twice, once thirty days from the original due date and once thirty days from the date the event was logged. A related deficiency is that, although there is a procedure by which a user can obtain advance scheduling information, the procedure is complicated and by no means user-friendly, making it unlikely to be used on a regular basis. Moreover, while WORKSTREAM includes a utility that can be used automatically to disable an entity if a scheduled event, such as PM, is not appropriately logged when due, this utility is deficient in that, when enabled, it is enabled for and affects other entities of the facility, thereby preventing use of entities which should not be disabled. The deficiencies suffered by this utility are magnified when an event is logged outside of the preselected window, as described above.

Therefore, what is needed is a utility for use in a manufacturing environment for tracking, monitoring and scheduling events in a manner such that a user is automatically notified of upcoming due dates and is able easily to generate and view a report of scheduled items for various entities in the facility.

SUMMARY OF THE INVENTION

The foregoing problems are solved and a technical advance is achieved by method and apparatus for a utility for monitoring, tracking and scheduling the performance of periodic activities in a manufacturing environment. In a departure from the art, the monitor utility of the present invention is capable of tracking various monitor items to determine when such items are due to be performed and proactively notifying designated users of items which are or will soon become due. In addition, the utility is capable of generating reports summing the status of various monitor items for each particular group, or "family," of monitored entities.

In a preferred embodiment, the monitor utility is a VAX-based menu-driven program that is used to schedule and track performance of periodic activities, or "monitor items," with respect to various entities. The utility may be used in a stand-alone mode, in which all data used to update the files of the utility relating to the status of monitor items is entered manually, or may be loosely coupled to WORKSTREAM or some other MES, in which case data files stored in a WORKSTREAM database are periodically converted to fiat, or ASCII, files, which are retrieved by the utility and stored in a database associated with the utility for use in updating the status of monitor items.

In one aspect of the invention, a user may create families of entities to be monitored and may schedule various monitor items to be performed in connection with each entity. In this aspect, monitor items may be "triggered" as being due by the occurrence of a user-designated event a user-designated number of times or by the elapse of a user-designated period of time. In the former case, the utility is capable of tracking the number of occurrences of the designated event and ear-marking the monitor item as due upon the occurrence of the event the designated number of times. In the latter case, the utility is capable of determining the due date and time of the monitor item, which due date and time are stored with the monitor item and periodically compared with the current date and time. When the due date and time and current date and time are equal, the monitor item is designated as being due. In addition, the utility is capable of generating a warning with respect to an upcoming due date of a monitor item a preselected amount of time before the item becomes due.

In another aspect of the invention, the utility may be used easily to generate and display and/or print reports in various formats showing the status of monitor items for a particular family and/or entity. In this aspect, the user is given several choices regarding the format and method of generation of such reports and the scope of information to be included thereon. For example, a user may choose to generate a report showing all monitor items due within a designated time period, e.g., the next 3 days, for a particular entity. Alternatively, the user may choose to generate a report showing all entities with respect to which a particular monitor item is due or past due.

In another aspect of the invention, the utility is capable of sending one or more VAX mail messages to designated users when certain monitor items are due and/or past due. In addition, the utility may be configured to send a VAX mail warning message to designated users a predetermined amount of time before a monitor item becomes due so that the recipient(s) can take steps to perform the monitor item by the due date. In yet another aspect of the invention, if a monitor item is not performed by the due date, the utility is capable of logging down the entity with which the overdue monitor item is associated.

A technical advantage achieved with the invention is that it permits a user easily and conveniently to generate and view reports showing the status of various monitor items in a variety of user-selectable formats.

Another technical advantage achieved with the invention is that it is capable of proactively notifying one or more designated persons when monitor items are due or are about to become due, thereby allowing the notified person(s) to take steps to schedule an appropriate time to perform the item without interfering with production.

Another technical advantage achieved with the present invention is that it is capable of "nagging" one or more designated persons of monitor items that are due until the items have been performed.

Yet another technical advantage achieved with the invention is that it is capable of logging down a particular entity for which a monitor item is due without affecting other entities for which no monitor items are due.

BRIEF DESCRIPTION OF THE DRAWINGS

FIG. 3 illustrates a screen display generated by the utility of FIG. 1 for prompting a user to enter a family name.

FIG. 4 illustrates a screen display generated by the utility of FIG. 1 for prompting a user to select a data source.

FIG. 5 illustrates a screen display of a Main Menu generated by the utility of FIG. 1.

FIG. 6A and 6B illustrate a screen display of a Monitor Page generated by the utility of FIG. 1.

FIG. 7 illustrates a screen display generated by the utility of FIG. 1 for prompting a user to enter an entity name.

FIG. 10 illustrates a screen display of a Status Page generated by the utility of FIG. 1.

FIG. 11 illustrates a screen display of a first Entity Page generated by the utility of FIG. 1.

FIGS. 12 and 13 illustrate screen displays of a Spec View function generated by the utility of FIG. 1.

FIG. 14 illustrates a screen display of a second Entity Page generated by the utility of FIG. 1.

FIG. 15 illustrates a screen display of a Status Summary generated by the utility of FIG. 1.

FIGS. 18A–18B illustrate an exemplary family configuration file embodying features of the present invention.

DESCRIPTION OF THE PREFERRED EMBODIMENTS

Figure 1:
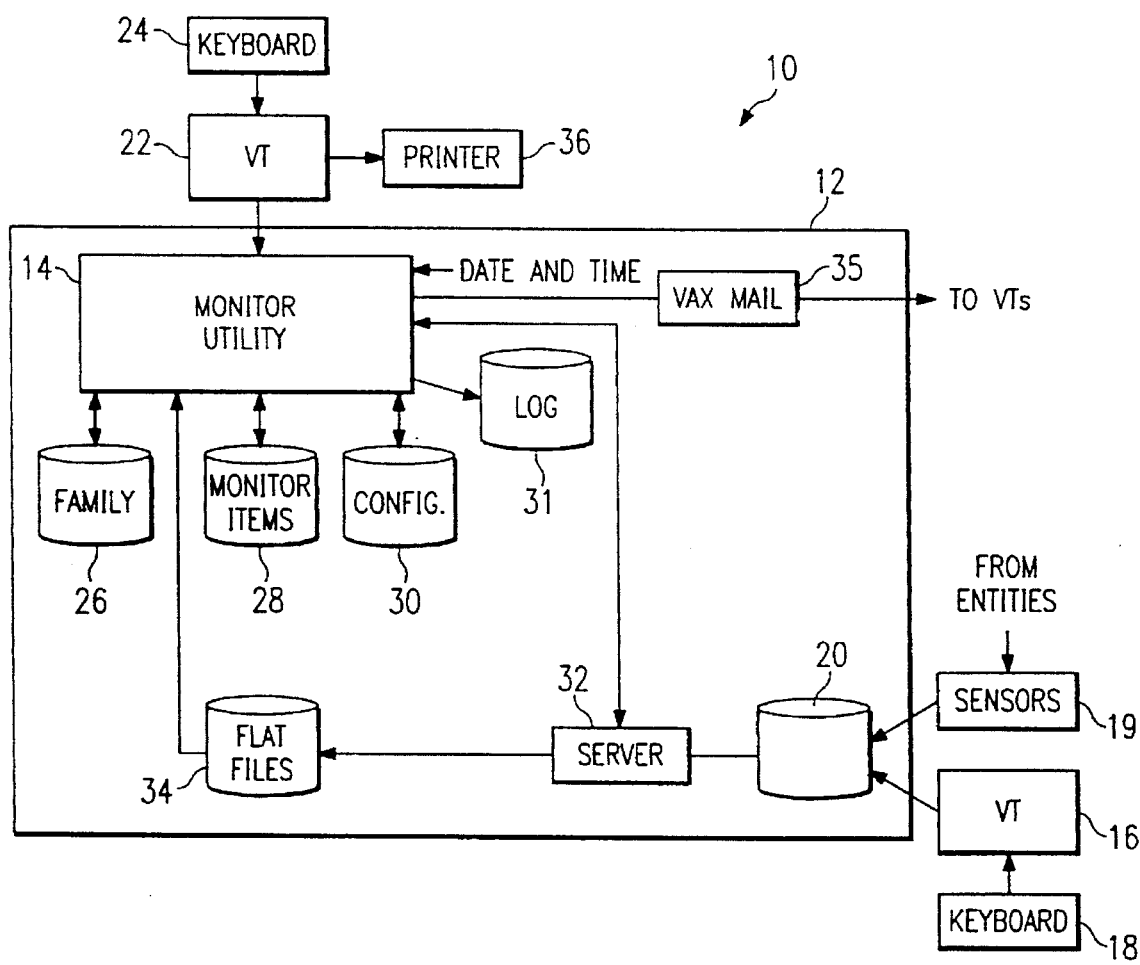
FIG. 1 is a block diagram of a VAX-based system including a monitor utility embodying features of the present invention.

FIG. 1 is a block diagram of a management execution system (MES) 10 embodying features of the present invention. In the preferred embodiment, the MES 10 includes a computer 12 comprising a monitor utility 14 for monitoring a variety of manufacturing tools and devices, referred to herein as "entities" (not shown), in a manner and for purposes to be described. In a preferred embodiment, the computer 12 is one of the VAX family of computers manufactured by Digital Equipment Corporation (DEC) of Waltham, Mass.; therefore, the terms "computer" and "VAX" may be used interchangeably herein. Connected to the computer 12 in a conventional manner are a plurality of video terminals (VTs) and associated keyboards, represented by VT 16 and keyboard 18, as well as a plurality of sensors 19, which are stationed throughout the manufacturing facility for inputting to a database 20 data regarding the status of the monitored entities. In the preferred embodiment, the database 20 comprises a WORKSTREAM database, although it should be understood that other appropriate databases may be used.

Additional VTs and associated keyboards, represented by the VT 22 and the keyboard 24, are connected to the monitor utility 14 for use in viewing and generating reports of scheduled procedures, as will be described. As will also be described, authorized users are given the ability to create new monitor families comprising groups of entities that share some common characteristic. When a monitor family is first created, three files are created in connection with the family, which include a family file ([family].dbs), a monitor items file ([family].mon), and a configuration file ([family].ini). Accordingly, also connected to the monitor utility 14 are three additional databases, including a family database 26, a monitor items database 28 and a configuration database 30 for storing [family].dbs files, [family].mon files and [family].ini files, respectively. A log database 30 for logging information regarding transactions, such as VAX mail messages, that have occurred is also connected to the utility 14.

In operation, at periodic intervals, for example, every two hours, the monitor utility 14 commands a server 32 to retrieve from the database 20 files that have been generated within the preceding interval and generate fiat files, or ASCII files, therefrom. The fiat files generated by the server 32 are stored in a database 34. The utility 14 then retrieves the fiat files from the database 34 and stores the information contained therein in the family database 26 for use in updating the status of monitor items stored in the monitor items database 28. In one aspect of the invention, responsive to a monitor item stored in the database 28 being due, the utility 14 generates a VAX mail message via a VAX mail system 35 to designated users to inform them of that fact. In another aspect of the invention, a user may issue commands to the utility 14 via the VT/keyboard 22/24, to cause a report to be generated and displayed on the VT 22 and/or printed on a printer 36 connected to the VT 22. In addition, the VT/keyboard 22/24 may be used to create and update information stored in the databases 28, 30 and 32, as will be described.

Figure 2A:
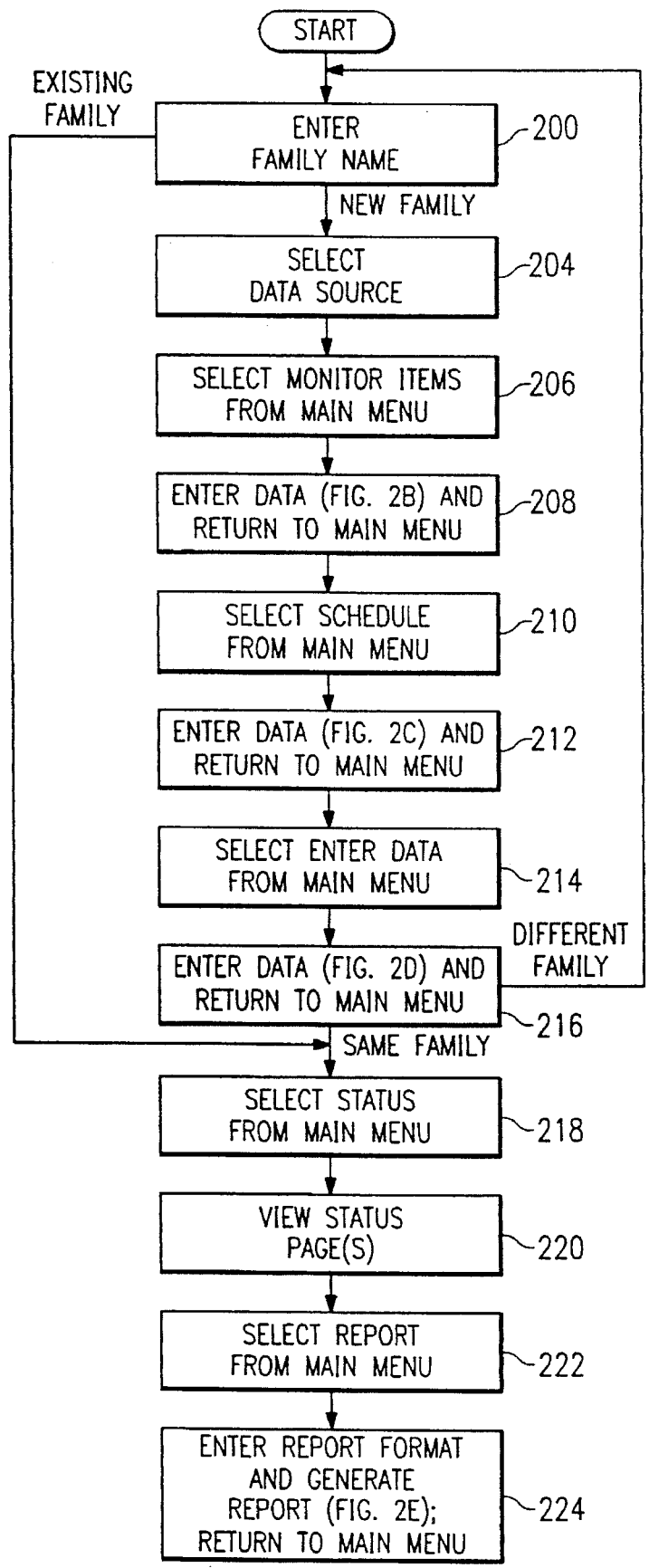
FIG. 2A is a flowchart of a particular method of using the utility of FIG. 1.

The operation of the monitor utility 14 of FIG. 1 will now be described in detail with reference to FIGS. 2A–2E and 3–17. Referring to FIG. 2A, after the user has logged on to the computer 12 and started the monitor utility 14 in an appropriate manner, which, it is understood, will vary according to the particularities of the MES 10, in step 200, the user will be prompted, as shown in FIG. 3, to enter a family name. As used herein, a "family" denotes a group of entities, typically sharing some common characteristic. For example, a "FURNACE" family may comprise a group of furnaces within a section of the facility. In the preferred embodiment, the user may scroll through a list of existing family names using the UP and DOWN keys of the keyboard 24 to display the names one at a time or may simply type in the family name after the prompt. The selected name is entered using the RETURN key. As will be recognized, and as shown in FIG. 3, a plurality of function keys are defined at a bottom section 300 of each screen display generated by the utility 14 to facilitate the entry of data and manipulation of screen displays. In this regard, it should be understood that, because the function key definitions are, for the most part, self-explanatory, use of particular function keys will not be described in detail except where appropriate to facilitate a complete understanding of the present invention.

If the family name entered in step 200 does not designate an existing family (i.e., one for which [family].dbs, .mon and .ini files have been created), indicating that the user wants to create a new family, execution proceeds to step 204.

Although not shown, it should be understood that, responsive to the entry of an unrecognized family name in step 200, the user may be queried as to whether he or she desires to create a new family. Assuming the user desires to create a new family, in step 204, the user is prompted, as shown in FIG. 4, via a screen 400, to select a data source by using the UP and DOWN arrow keys to scroll through data source options and the RETURN key to confirm the selection. In the preferred embodiment, the user can select "Workstream Link," in which case data from the database 20 will be linked to the utility 14 via the server 32, as described above, or "No Workstream Link," in which case data from the database 20 will not be stored in the utility databases 26, 28 and 30.

Responsive to the selection of a data source in step 204, a Main Menu, as shown in FIG. 5 and designated by a reference numeral 500, is displayed on the VT 22. As illustrated, the Main Menu 500 comprises seven (7) menu picks, including STATUS PAGE, ENTER DATA, SCHEDULE, MONITOR ITEMS, REPORT, CHANGE GROUP, and EXIT. It should be noted that a field 502 in the upper left portion of the screen contains the family name entered in step 200, which, in the illustrated embodiment, is "FURNACE." In addition, a field 504 centered in an upper portion of the screen indicates the facility name, which, in the illustrated embodiment, is "FAB14." In step 206, MONITOR ITEMS is selected from the Main Menu 500, at which point, a blank Monitor Page, as shown in FIG. 6A and designated by a reference numeral 600, is displayed. In step 208, the user fills in the Monitor Page 600 fields with appropriate information, as will be described in detail with reference to FIG. 2B, and then returns to the Main Menu 500 (FIG. 5) by pressing the SFK1 key. A completed Monitor Page is shown in FIG. 6B.

Figure 2B:
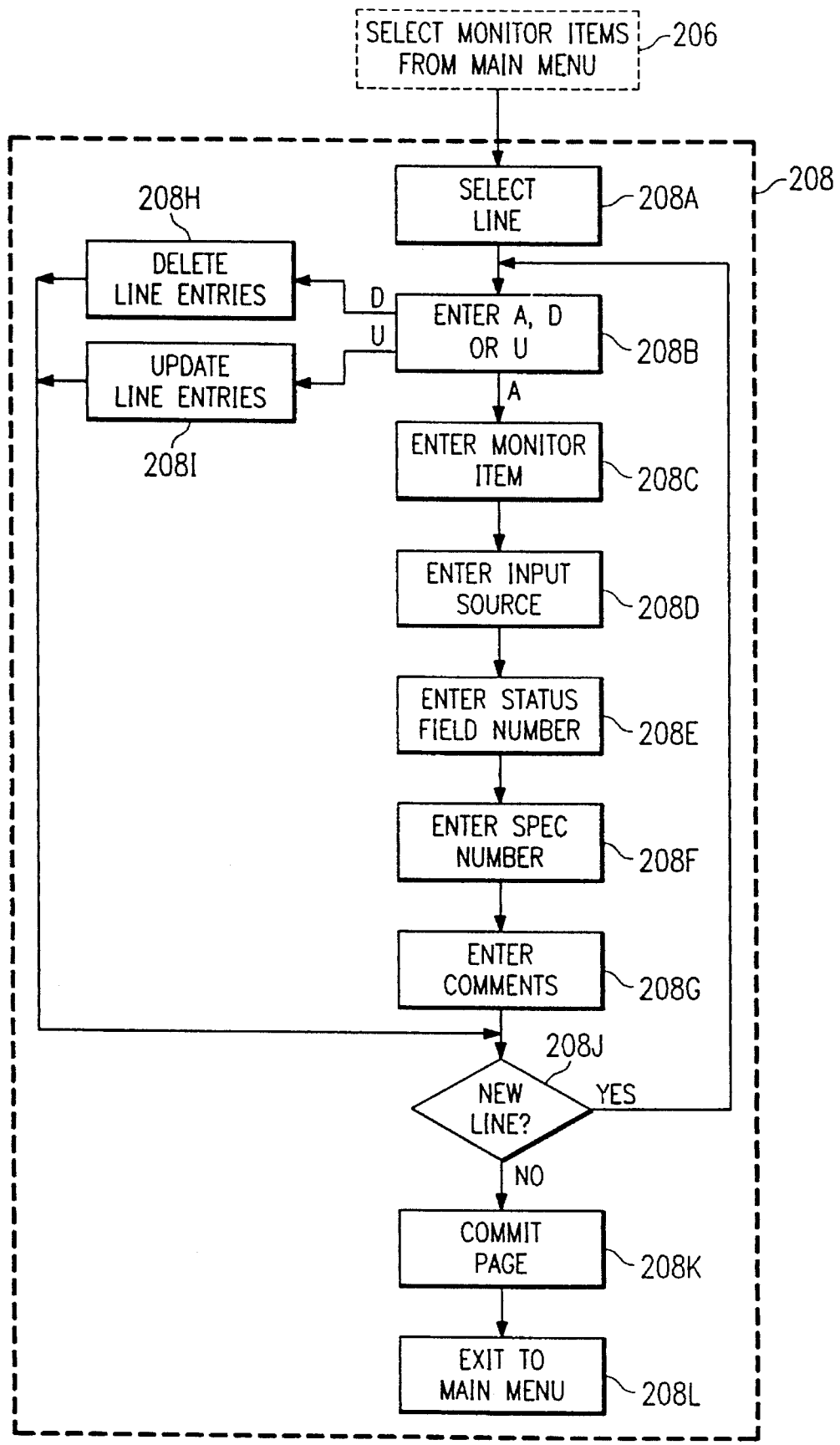
FIG. 2B is a flowchart of a Monitor Items process of the utility of FIG. 1.

Referring now to FIG. 2B, completion of the Monitor Page 600 (FIG. 6A and 6B) will be described. After MONITOR ITEMS has been selected in step 206, execution proceeds to step 208A, in which the user selects a line of the Monitor Page 600, such as a line 602, using the UP and DOWN arrow keys of the keyboard 24 or other appropriate means. It should be obvious that the line selected by the user will typically be the next empty line, unless a completed line is to be deleted or updated, as will be described. In step 208B, the user enters an "A", a "D" or a "U" in an ADU field 604 of the selected line 602, depending on whether the user wants to ADD, DELETE or UPDATE the line 602, respectively. If the user enters an "A" in the ADU field 602, execution proceeds to step 208C, in which the user enters a monitor item in a Monitor Item field 606 of the selected line 602. As used herein, "monitor item" refers to an action that needs to be performed on an entity at a certain time or dependent on the occurrence of some other action or "event." Examples of monitor items include "TUBE CHANGE" and "CV TEST." As a practical matter, the monitor items should be entered on the Monitor Page 600 in order of frequency of use, with the most frequently used items appearing toward the top of the list.

In step 208D, the user selects an input source to be entered in an Input Source field 608 of the selected line 602 for specifying how the data for use in connection with the corresponding monitor item in the field 606 is to be input. In the preferred embodiment, possible Input Source field 608 entries include "Manual," "Workstream" or "Both," of which "Both" is typically selected to enable the least restrictive range of data inputs. In step 208E, a status field number may be entered in a Status field 610. In the preferred embodiment, the status field number designates a WORKSTREAM status field from which data is to be extracted for use in connection with the corresponding monitor item in the field 604, it being noted that the field 610 is only effective for lines in which the corresponding Input Source field 608 entry is "Workstream" or "Both." In step 208F, an internal specification document identifier, comprising a series of alphanumeric characters, may be entered in a Spec. No. field 612. The Spec. No. field 612 entry links an internal specification document designated by the specification document identifier and stored in the database 20, or a similar database (not shown) to the associated monitor item in the field 606 for purposes that will be described in detail with reference to and FIGS. 11 and 12. In step 208G, the user enters any appropriate comments in a Comments field 616. For example, where the entry in the Monitor Items field 604 is an abbreviation, the Comments field 616 may contain a more detailed explanation of the monitor item.

Returning to step 208A, if the user enters a "D" in the ADU field 604 of the selected line 602, in step 208H, the entries in each field 604, 606, 608, 610, 612 and 616 of the line 602 are deleted upon the user's depressing the RETURN key while the cursor is in the ADU field 604. Alternatively, if the user enters a "U" in the ADU field 604 of the selected line 602, in step 208I, the user is permitted to update individual entries in one or more of the fields 606, 608, 610, 612 and 616 by using a TAB key of the keyboard 24 to move the cursor to the desired field and then amend the entry as desired. Upon the completion of steps 208G, 208H or 208I, execution proceeds to step 208J. In step 208J, if the user has selected another line, execution returns to step 208B; otherwise, execution proceeds to step 208K, in which the entries on the Monitor Page 600 are "committed" by the user's pressing the RETURN key while the cursor is in the ADU field 604. A completed Monitor Page is shown in FIG. 6B. In step 208L, the user returns to the Main Menu 500 (FIG. 5) by pressing the SFK1 key. It should be noted that the user may make entries for a particular entity on more than one Monitor Page, in which case, the user would toggle between the multiple Monitor Pages using the SFK4 and SFK6 keys.

Referring again to FIG. 2A, in step 210, the user selects the "SCHEDULE" menu pick from the Main Menu 500 to schedule for each entity the monitor items entered in step 208. As will be described in greater detail with reference to FIG. 2C, in step 212, the user completes a Schedule Page (FIG. 8) with appropriate information.

Figure 2C:
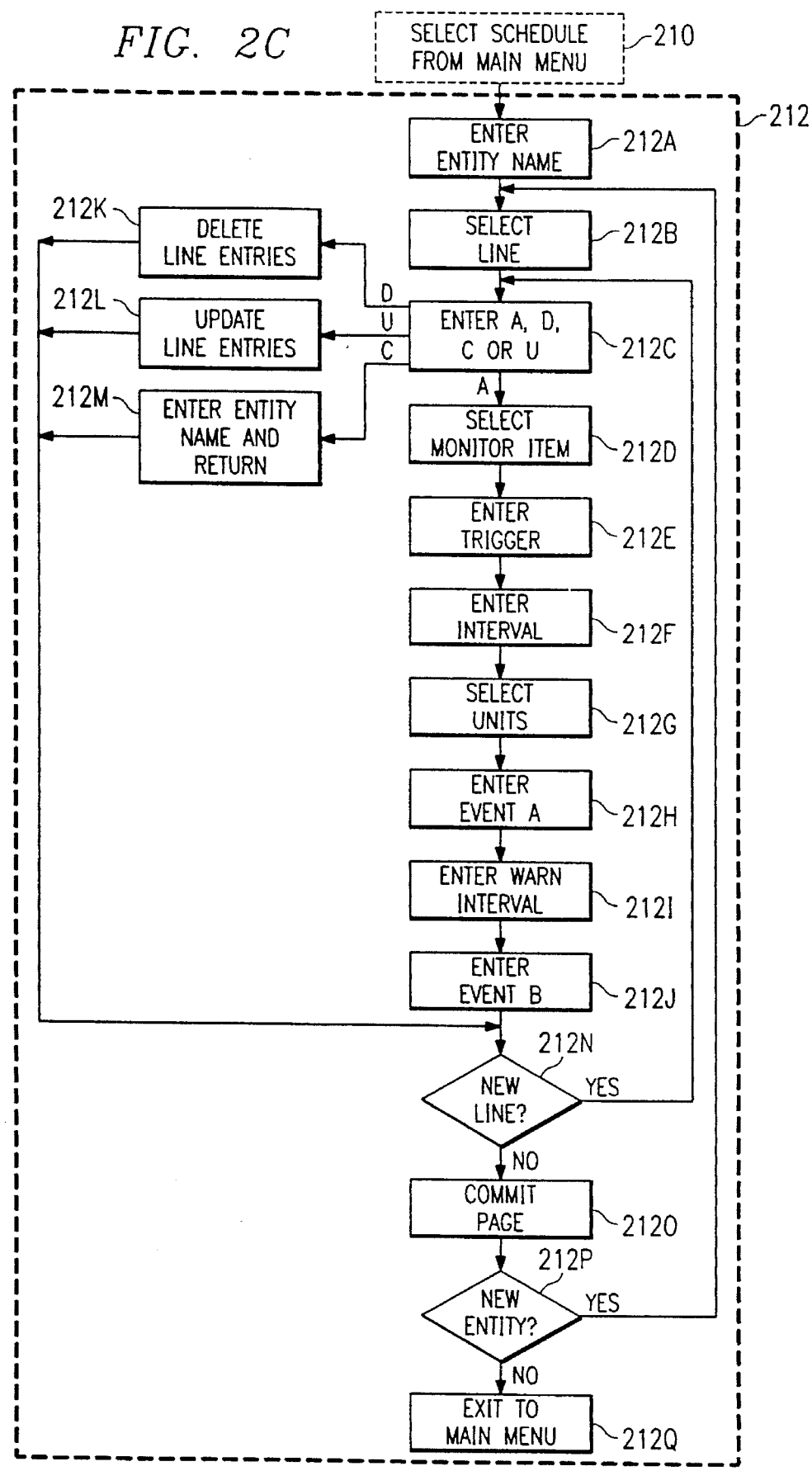
FIG. 2C is a flowchart of a Schedule process of the utility of FIG. 1.
Figure 8:
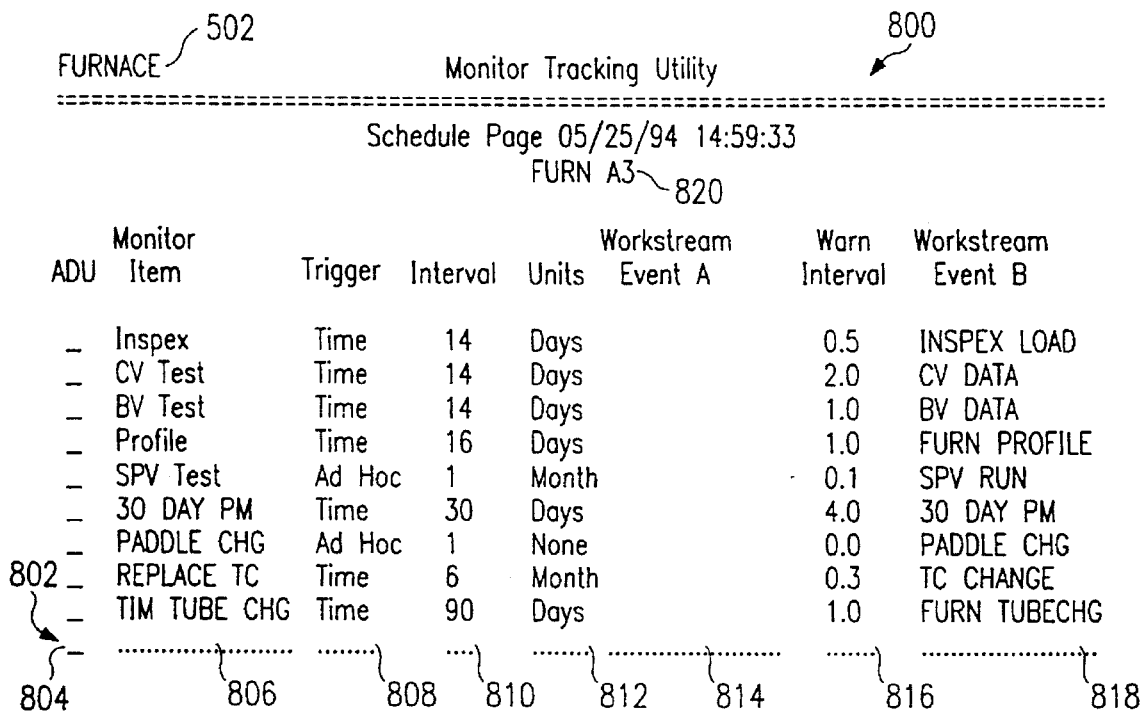
FIG. 8 illustrates a screen display of a Schedule Page generated by the utility of FIG. 1.

Referring to FIG. 2C, after the user has selected the SCHEDULE menu pick in step 210, in step 212A, the user is prompted, as shown in FIG. 7, to enter the name of an entity to be scheduled. As used herein, "entity" refers to a tool or other machinery upon which a monitor item is performed. Examples of "entities" in the context of a submicron fabrication facility include furnaces, sinks, photolithography steppers, and etchers. Once an entity name has been entered in step 212A, a Schedule Page is displayed. A partially completed Schedule Page is shown in FIG. 8 and designated by a reference numeral 800. Similar to the Monitor Page 600, each line of the Schedule Page 800, such as the line 802, comprises a plurality of fields, including an ADU field 804, a Monitor Item field 806, a Trigger field 808, an Interval field 810, a Units field 812, an Event A field 814, a Warn field 816, and an Event B field 818, each of which are described in further detail below. In addition, a field 820 contains the name of the entity being scheduled, which, in this case, is "FURN A3."

In step 212B, the user selects a line, such as the line 802, using the UP and DOWN arrow keys of the keyboard 24. In step 212C, the user enters an "A", "D", "U" or "C" (for COPY) in the ADU field 804 of the selected line 802. If the user enters an "A" in the ADU field 804, execution proceeds to step 212D, in which the user enters one of the monitor items previously entered on the Monitor Page 600. In a preferred embodiment, the user may scroll through a list of the monitor items previously entered on the Monitor Page 500 in step 208 by using the UP and DOWN keys of the keyboard 24. In step 212E, the user enters a trigger in the Trigger field 808. In the preferred embodiment, accepted triggers include: (1) "time," in which case an event in the Event B field 818 (the "reset event") will be "triggered" by the elapse of a time period specified by entries in the Interval and Units fields 810, 812; (2) "counts," in which case the reset event will be triggered by the occurrence of a particular number of counts acquired from WORKSTREAM or entered manually; (3) "event," in which case the reset event will be triggered by the occurrence of the event specified in an Event A field 814 (the "trigger event") the number of times specified by the Interval field 810 entry; (4) "ad hoc," in which case the reset event will be performed on an "as needed" basis; and (5) "clockd," in which case the occurrence of the trigger event will cause the Trigger field 808 entry to be switched to "clk ON" and the reset event will be triggered upon the expiration of the time period specified by the Interval and Units fields 812 after the occurrence of the trigger event.

In steps 212F and 212G, the user enters a value and unit in the Interval and Units fields 810, 812, respectively. It should be clear that the Units field 812 entry will be dependent on the Trigger field 808 entry; that is, if the Trigger field 808 entry is "time," the possible Units field 812 entries will include "minutes," "hours" "days," "shift," "week" and "month," whereas if the Trigger field 808 entry is "count" or "event," the Units field 812 entry may be "each" or "total." In a preferred embodiment of the invention, the user may scroll through a list of possible Units field 812 entries, wherein the list will include only those entries appropriate for use with the Trigger field 808 entry, using the UP and DOWN keys of the keyboard 24.

With respect to monitor items that are triggered, either wholly or in part, by the elapse of a user-selected time interval, it should be understood that the utility 14 computes a due date and time (if required) for each such monitor item, which due date and time is stored with the monitor item and periodically compared to a current date and time input to the utility 14 from the computer 12. When the stored due date and time and the current date and time are equal, the monitor item is designated by the utility as "DUE." Similarly, if a warning is to be generated for a monitor item a designated period of time prior to the due date and time, a warn date and time (if required) for each such monitor item may be computed, stored and compared, with the monitor item being designated by the utility 14 as "WARN" and a warning being issued when the stored warn date and time and the current date and time are equal.

In step 212H, the user enters a trigger event, if needed, in the Event A field 814. As used herein, "trigger event" refers to an event the occurrence of which is counted against the number specified in the Interval field 810 when the entry in the Trigger field 808 is "events." In other words, when the trigger event in the Trigger field 808 occurs the number of times specified in the Interval field 810, the associated monitor item in the field 806 is DUE. In step 212I, the user enters a value in the Warn Interval field 810. The value in the Warn Interval field 816 operates in combination with the Units field 812 entry to define how long before the monitor item in the field 806 is DUE a warning should be issued. For example, if the Units field entry is "Days" and the value in the Warn Interval field 816 is "3," a warning will be issued, e.g., by sending a VAX mail 35 message to one or more designated users, as will be described, three (3) days before the monitor item is DUE. In step 212J, the user enters a reset event in the Event B field 818. The reset event indicates that the monitor item in the field 806 has been completed.

The following examples are illustrative of the above-described scheduling procedure. For example, assuming for a particular monitor item, the Trigger field 808 entry is "event," the Interval field 810 entry is "10," the Units field 812 entry is "total," the Event A field 814 entry is "FURN BEG RUN," and the Warn Interval field 816 entry is "2," the current count will be incremented by 1 each time a FURN BEG RUN event is entered, either manually or via the database 20. When the current count reaches 8, a warning will be issued; when the current count reaches 10, the monitor item will be DUE. Alternatively, assuming for a particular monitor item, the Trigger field 808 entry is "time," the Interval field 819 entry is "30," the Units field 812 entry is "days," the Warn Interval field 816 entry is "4," and the Event B field 818 entry is "30 DAY PM," upon the elapse of 26 days from the date a "30 DAY PM" event was last entered, a warning will be issued, upon elapse of 30 days from the date a "30 DAY PM" event was last entered, the monitor item will be DUE and will remain DUE until a "30 DAY PM" event is entered.

Returning to step 212C, if a "D" is entered in the ADU field 804, execution proceeds to step 212K, in which all entries in the line 802 are deleted by the user's pressing the RETURN key while the cursor is in the field 804. Alternatively, if a U is entered in the ADU field 804, execution proceeds to step 212L, in which the user is permitted to update entries in the line 802 as needed. Finally, if a "C" is entered in step 212C, execution proceeds to step 212M, in which the user enters the name of an entity to which the line is to be copied in a field 822 (FIG. 8) and then presses the SFK5 key to copy the line to the selected entity.

Subsequent to steps of 212J, 212K, 212L or 212M, execution proceeds to step 212N. In step 212N, if the user has selected another line, execution returns to step 212C; otherwise, execution proceeds to step 212O, in which the user commits the Schedule Page entries by pressing the RETURN key while the cursor is in the ADU field 804. In step 212P, if a new entity is entered, execution returns to step 212B; otherwise, execution proceeds to step 212Q. In step 212Q, the user returns to the Main Menu 600 by pressing the SFK1 key.

Referring again to FIG. 2A, in step 214, the ENTER DATA menu pick is selected from the Main Menu 600 to update the current status of the monitor items. In step 216, as described in detail with reference to FIG. 2D, an Update page is completed for a selected entity.

Figure 2D:
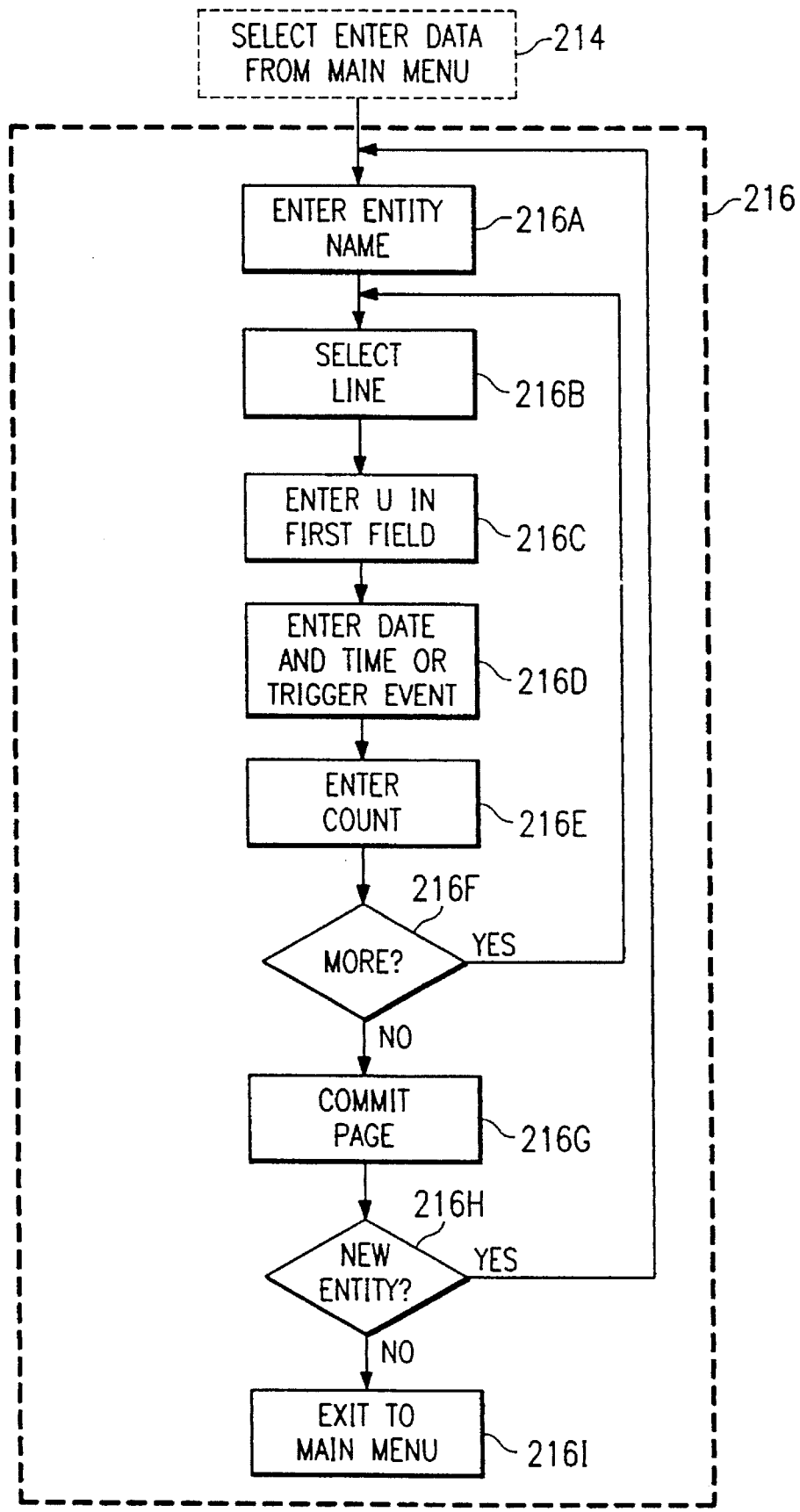
FIG. 2D is a flowchart of an Update process of the utility of FIG. 1.
Figure 9:
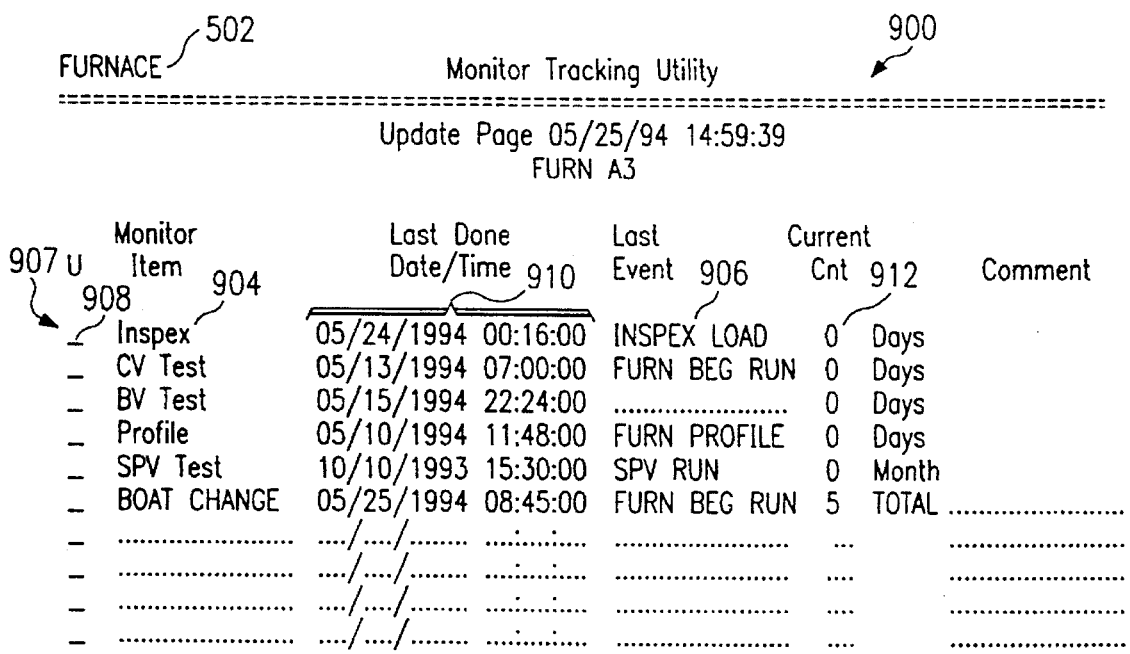
FIG. 9 illustrates a screen display of an Update Page generated by the utility of FIG. 1.

Referring to FIG. 2D, responsive to selection of the ENTER DATA menu pick in step 214, in step 216A, the user is prompted to enter an entity name, as shown in FIG. 7. Responsive to entry of an entity name in step 216A, an Update Page, as shown in FIG. 9 and designated by a reference number 900, is displayed. As first displayed, the Update Page 900 includes the monitor items previously scheduled on the Schedule Page 800 (FIG. 8) for the current entity, in this case, "FURN A3." The Update Page 900 is used to initialize starting values for each of the monitor items scheduled for each entity to bring the utility 14 up-to-date. Moreover, when the utility 14 is used in a stand-alone mode, all subsequent data entry regarding events will be entered using the Update Page 900. It should be understood that a Monitor Item field 904 and a Last Event field 906 are automatically filled in by the utility 14 with monitor items and associated reset events previously entered in the Monitor Item field 806 and Event B field 818, respectively, of the Schedule Page 800 (FIG. 8).

In step 216B, the user selects a line to be updated, such as the line 907, using the UP and DOWN arrow keys of the keyboard 24. In step 216C, the user enters a "U" in a U field 908 of the selected line 907. After the user enters a U in the field 908 of the selected line 907, the cursor advances directly to a Last Done Date/Time field 910. In step 216D, the user enters the date and time the event specified in the Last Event field 906 of the line 907 was last performed in the Last Done Date/Time field 910. In step 216E, the user updates a Current Count field 912, if necessary. In step 216F, if there are more lines to be updated, execution returns to step 216B; otherwise, execution proceeds to step 216G. In step 216G the user enters the data on the Update Page 900 by pressing the RETURN key and execution proceeds to step 216H. In step 216H, if a new entity is to be updated, execution returns to step 216A; otherwise, in step 216I, the user presses the SFK1 key to exit to the Main Menu 500 (FIG. 5). Alternatively, the user can enter the trigger event in the last update field 906, which will cause the system date and time to be entered in the field 910 if the item was just done.

Referring again to FIG. 2A, upon completion of step 216, if the user desires to generate and view a report for the newly created family, execution proceeds to step 218; otherwise, execution returns to step 200. In addition, responsive to entry of an existing family name in step 200, the Main Menu 500 is displayed and execution proceeds directly to step 218. In step 218, the STATUS menu pick is selected from the Main Menu 500. In step 220, a Status Page, illustrated in FIG. 10 and designated by a reference numeral 1000, is displayed. A single status page, such as the status page 1000, can display up to forty-eight (48) entries, collectively designated by a reference numeral 1002, each comprising an Entity portion, designating the entity with which the entry is associated, and a Status portion, designating the status of the entity specified in the Entity portion. It should be understood that, although supported, multiple Status Pages 1000 are not recommended, as a one page summary is more efficient and easy to read. Moreover, when more than one page of entities are used, the sort keys 1–7 may be used to sort by "DUE," "WARN," "EST," and "OK," thereby allowing all due items to appear on the first page.

As illustrated in FIG. 10, entries corresponding to an entity having a monitor item which is DUE, such as the entry 1002a, are displayed in bold face. Similarly, entries corresponding to entities having monitor items that will become due within the specified warning interval (FIG. 8), such as the entry 1002b, are underlined. A numeric summary of all monitor items that are DUE, not including Ad Hoc items, is indicated in a field 1004 centered below the entries 1002. To obtain more information regarding the status of monitor items for a particular entity, the user selects the one of the entries 1002 that corresponds to the selected entity using the UP and DOWN keys of the keyboard until the entity is highlighted, and then presses the RETURN key to display an First Entity Page, as shown in FIG. 11 and designated by a reference numeral 1100. The Entity Page 1100 details the monitor items of the selected entity and the status of each monitor item, including the due date (or estimated due date, where the Interval entry is other than time), intervals remaining until the next due date, the last event logged for the monitor item and the last time the monitor item was performed. It should be noted that, again, monitor items that are due are displayed in boldface, while monitor items that will be due within the period set for warning are underlined.

From the First Entity Page 1100, the user can access and view a specification related to and providing information on a selected monitor item by using the UP and DOWN arrow keys to select a monitor item, and then pressing the SFK5 key. This operation results in a first Spec View page as shown in FIG. 12 and designated by a reference numeral 1200, to be displayed. From the Spec View page 1200, the user can view other pages of the accessed specification by pressing the SFK4 and SFK6 keys. Other specifications can be accessed using the Spec View page 1300 shown in FIG. 13.

In addition, the user can access a Second Entity Page, as shown in FIG. 14 and designated by a reference numeral 1400, from the First Entity Page 1100 by selecting a monitor item with the UP and DOWN arrow keys and then pressing the SFK4 key. The Second Entity Page 1400 displays additional status information, in the form of Status Items, for the monitor item selected on the Status Page 1100, such as the availability of the entity, the reset event associated with the monitor item ("CURRENT_EVENT"), and the date and time the reset event was last performed ("Last Event D/T"), as well as other information specific to the type of monitor item. From the Second Entity Page 1200 a Status Summary of a selected Status Item may be displayed for all entities shown on the Status Page 1000 by selecting a Status item, such as "AVAILABILITY," using the UP and DOWN keys, and then pressing the SFK7 key. A Status Summary of the availability of the first 24 of the 48 entities of the Status Page 1000 (FIG. 10) is shown in FIG. 15. The availability of the remaining 24 items may be viewed by pressing the SFK4 key. Although not shown, it should be understood that a summary of the remaining status items for the 48 entities may be viewed in a similar manner. At any time, the user may exit to the Main Menu 500 by pressing the SFK1 key.

Referring again to FIG. 2A, in step 222, the user selects the REPORT menu pick from the Main Menu 500. In step 224, the user selects a report format from a Report Format screen, as described in greater detail with reference to FIGS. 2E and 16.

Figure 2E:
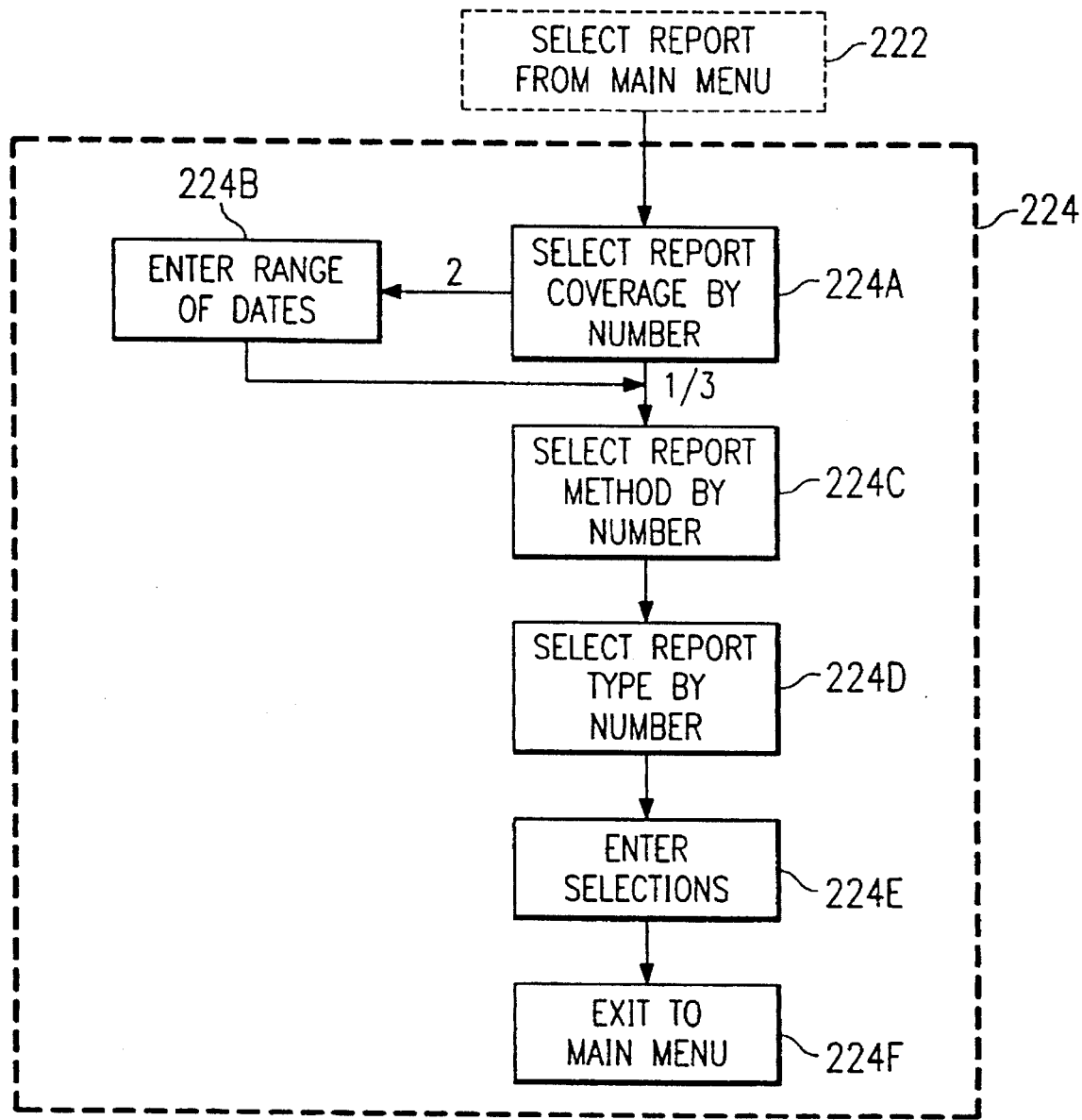
FIG. 2E is a flowchart of a Report Generation process of the utility of FIG. 1.
Figure 16:
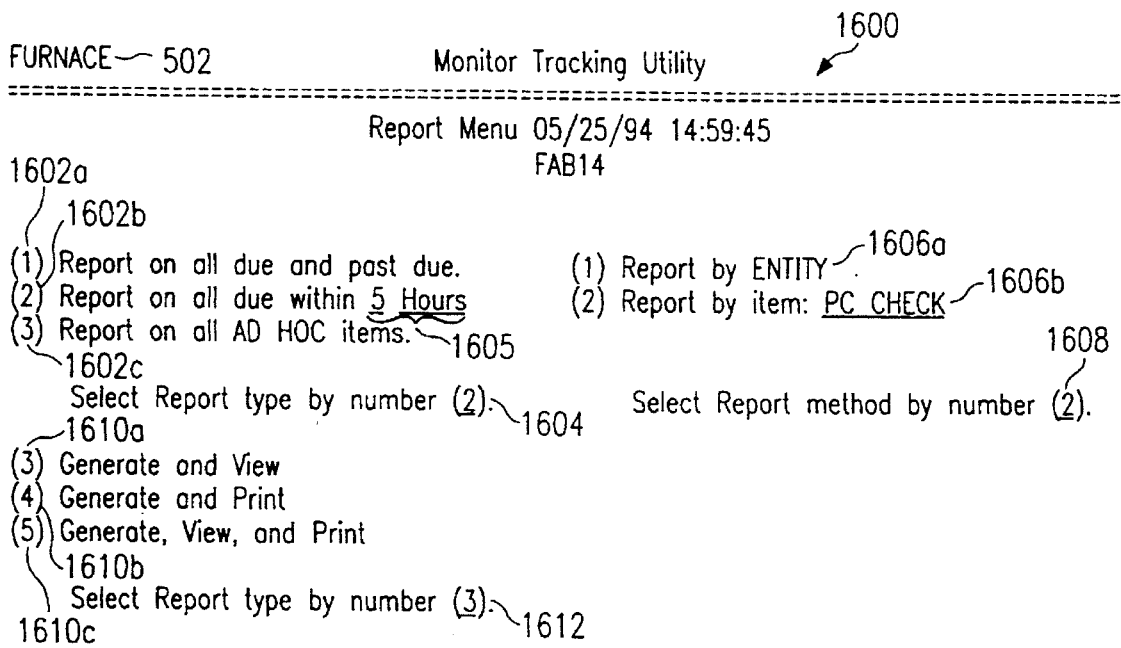
FIG. 16 illustrates a screen display of a Report Menu generated by the utility of FIG. 1.

Referring to FIG. 2E, once the user has selected the REPORT menu pick in step 222, a Report Menu, as shown in FIG. 16 and designated by a reference numeral 1600, is displayed. In step 224A, the user selects one of three types of report coverages 1602a, 1602b and 1602c by entering a number associated with the selected coverage in response to a prompt 1604. For example, the user may enter a "1" in response to the prompt 1604 to generate a report covering all due and past due monitor items, a "2" to generate a report covering all items due within a time period specified by a user, and a "3" to generate a report on all "Ad Hoc" items. If in step 224A, the user enters a "2," execution proceeds to step 224B, in which the user is prompted to enter a coverage time period in a field 1605, and execution proceeds to step 224C. If in step 224A, the user enters a "1" or "3," execution proceeds directly to step 224C. In step 224C, the user selects one of the two report methods 1606a, 1606b by entering a number associated with the selected method in response to a prompt 1608. For example, the user may enter a "1" to generate a report by entity or a "2" to generate a report by monitor item.

In step 224D, the user selects one of three report types 1610a, 1610b, 1610c, by entering a number associated with the selected type in response to a prompt 1612. For example, the user may "Generate and View" a report by selecting "3", in which case the report will be displayed on the VT 22 and not printed; may "Generate and Print" the report by selecting "4," in which case the report will be printed on the printer 36 only and not displayed on the VT 22; or may "Generate, View and Print" the report by pressing "5," in which case the report will be displayed on the VT 22, as well as printed on the printer 36. In step 224E, the user presses the RETURN key to generate a report in the requested format.

Figure 17:
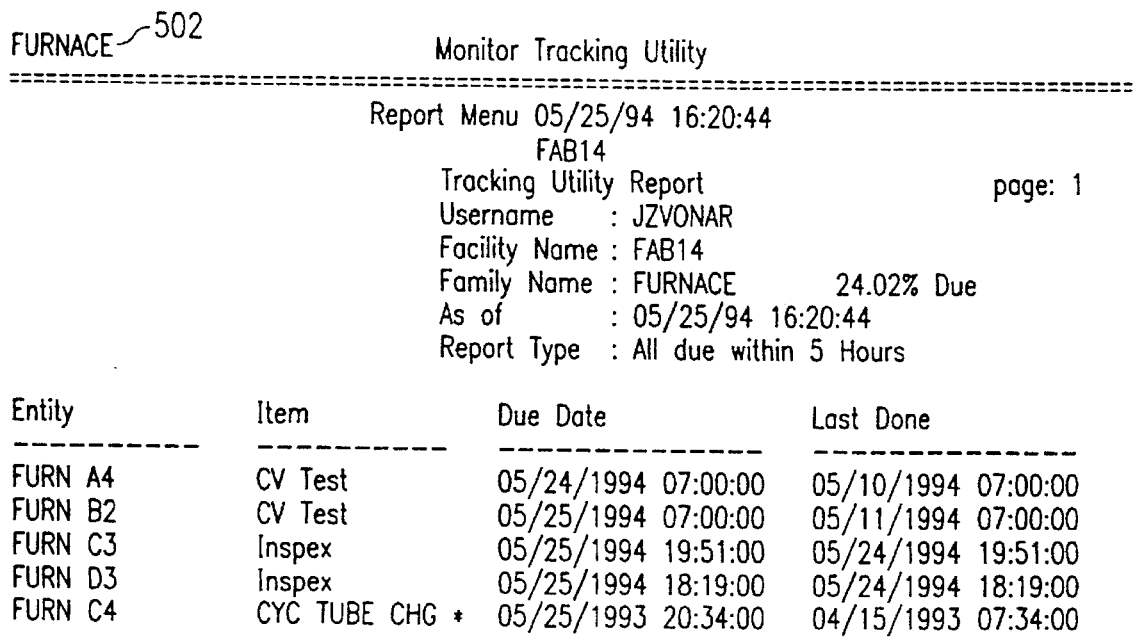
FIG. 17 illustrates a screen display of a Report generated by the utility of FIG. 1.

An exemplary report of all monitor items due within five hours is shown in FIG. 17. It should be noted that, in the preferred embodiment, an asterisk (*) next to an item indicates that the due date has been estimated based on past performance. Such estimates are used only in connection with items that do not use time triggers. Referring again to FIG. 2E, in step 224F, the user presses the SFK1 key to exit to the Main Menu 500.

As previously indicated, when a family is first created, three files will be created in connection with the family, which are a family file ([family].dbs), which is stored in the family database 26 and contains the main information about the family, a monitor file ([family].mon), which is stored in the monitor database 28 and contains monitor item information for the family, and a configuration file ([family].ini), which is stored in the configuration database 30 and contains information relating to the operation of the utility on a family by family basis. The initial default configuration file will contain the minimum number of sections and the minimum default values necessary to allow the utility to operate with respect to the family. In the preferred embodiment, configuration files may be edited with any ASCII text file, such as the VAX EDT editor.

Each configuration file, such as the exemplary configuration file shown in FIGS. 18A and 18B, comprises up to fifteen (15) sections, each of which has a section name identified in brackets ([]) and is essentially optional. The default configuration file will comprise a minimum number of sections. The configuration file shown in FIGS. 18A and 18B comprises an [ACCESS] section 1802, a [RLVN] section 1804, an [NFMB] section 1806, an [NTC] section 1808, a [LOG] section 1810, a [SPEC] section 1812, a [UNIT] section 1814, a [DBUG] section 1816, a [HELP] section 1818, a [CHILD] section 1820, a [DEQUE] section 1822, a [SORT] section 1824, a [DUE] section 1826 and a [WARN] section 1828. Under each section are various key words followed by a separator character, such as a colon (:), then one or more pieces of information, each isolated by a separator character.

The [ACCESS] section 1802 specifies the users that have access to the utility, as well as the type of afforded each such user. The [LOG] section 1810 specifies the format of transaction and usage logs created by the utility 14 as well as where those logs are to be stored. The [SPEC] section 1812 specifies the location in the database 20 of specification files accessed by the utility 14. The [UNIT] section 1814 specifies the number of minutes comprising an interval value referred to as a "shift." For example, a shift may be 8 hours (720 minutes) or 12 hours (960 minutes). The [DBUG] section 1816 contains information relating to a debug log. The [HELP] section 1818 specifies the location of help files accessed by the utility 14. The [CHILD] section 1820 indicates the location of a child executable program. The [SORT] section 1824 specifies the order in which entities are to be sorted.

The [DUE] and [WARN] sections 1826, 1828, as well as an [EST] section (not shown) are optional sections that specify what user(s) is to be notified via VAX mail 35 message and whether an event is to be logged in the database 20 when the status of a monitor item is DUE or WARN or when a monitor item is estimated to be DUE, respectively. For example, referring to the [DUE] section 1826, because the information following the "times:" keyword is set to "nag", when an item first becomes DUE, the utility 14 will log the due event, which in this case is MONITOR DWN against the entity. The next time the utility runs, if the item is still DUE, the utility 14 will log the nagging event, in this case, "MON STIL DUE," against the entity and notify the appropriate users. This will continue until the item is performed and logged.

Alternatively, if the information following the "times:" keyword is set to "once," when the item has become DUE, the utility 14 will attempt to log the indicated event, again "MONITOR DWN," against the entity. Once the event is successfully logged, the utility 14 will make no further attempts at logging. If the keyword following "times:" is "always," the utility 14 will continue to attempt to log the indicated event "MONITOR DWN" every time the utility runs and the item is still DUE. In addition, the utility 14 will log down, or render inoperable, the entity each time the utility 14 runs and the item is still due. It should also be noted that, a user may override this function temporarily by logging the entity back up; however, unless the nagging function is turned off or the DUE item performed, when the utility 14 runs again, because the item is still DUE, the entity will be logged back down. Finally, if the information following "times:" is "never," the event MONITOR DWN is never logged. The [WARN] and [EST] sections operate in the same manner, except that "times: nag" is not supported. In all three sections, the information following "mail:" specifies the computer 12 user(s) to receive DUE, WARN and EST notifications, respectively. It should be noted that the [DUE], [WARN] and [EST] sections are entirely optional.

The [NTC] section specifies the format of the ASCII files processed by the utility 14. The remaining sections, [RLVN], [NFMB] and [DEQUE] are specific to use of the utility 14 in a WORKSTREAM environment and are therefore not further described in detail.

Figure 19:
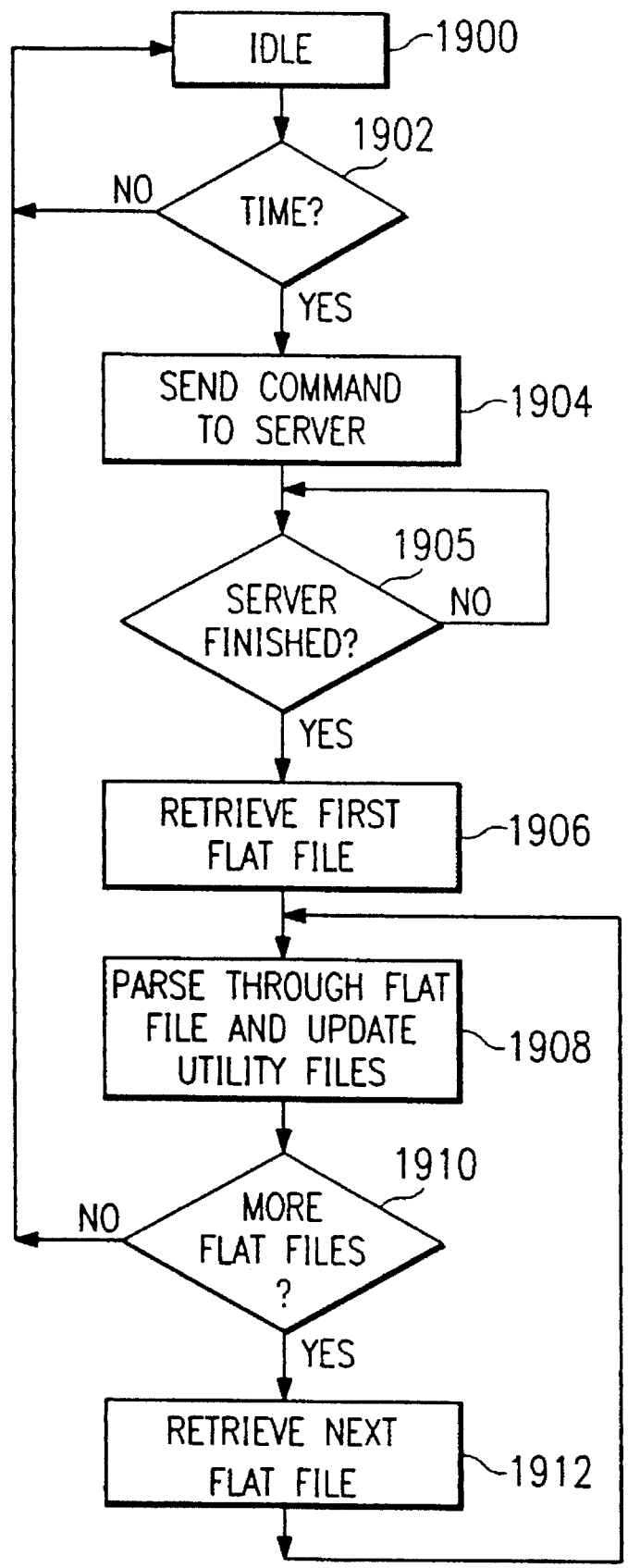
FIGS. 19 and 20 are flowcharts of the operation of various features of the utility of FIG. 1.

As previously indicated, in operation, the utility 14 periodically powers up and transmits a command to the file server 32 to retrieve files from the database 20 and generate fiat files therefrom, which are stored in the database 34 to be retrieved by the utility 14 and stored in the database 26. Referring now to FIG. 19, the operation of the utility 14 will described in greater detail. In step 1900, the utility 14 is in an IDLE state in which it is capable of communicating with the VT 22 but is not actively communicating with the database 20. In step 1902, a determination is made whether a preselected rime period has expired the last rime the utility 14 was updated with information from the database 20. For example, for certain applications, it may be desirable for the utility files to be updated as often as once every hour. Alternatively, it may be more efficient for the utility files to be updated less frequently, for example, once a day.

If in step 1902, the preselected rime period has not expired, the utility 14 returns to the wait state in step 1900. Alternatively, if in step 1902, the preselected amount of time has expired, execution proceeds to step 1904, in which the utility 14 generates a command to the server 32 to cause it to access files in the database 20 that have been added since the last time the utility 14 was updated and generate fiat files therefrom. In step 1905, the utility 14 awaits a signal from the server 32 indicating that the generated fiat files are ready to be accessed from the database 34. Once the utility 14 has been signalled by the server in step 1905, execution proceeds to step 1906, in which the utility 14 retrieves the first fiat file from the database 34 in step 1906. In step 1908, the utility 14 parses through the retrieved file and updates its own files stored in the database 26 accordingly in a known manner. At this point, it should be clear that the names used to designate families, entities, monitor items, and events must be consistent between the database 34 and the utility 14, regardless of the origin of the files stored in the database 34. For example, if a particular entity is designated as "FURN A3" by the utility 14, that same entity must be designated as "FURN A3" in the files of the database 20.

Once the utility 14 has finished parsing through the first fiat file, a determination is made in step 1910 whether there are more fiat files to be retrieved from the database 34. If so, execution proceeds to step 1912, in which the utility 14 retrieves the next file, and then returns to step 1908. If in step 1910 it is determined that there are no more fiat files, execution returns to the IDLE state in step 1900.

As previously noted, in one aspect of the invention, the utility 14 must periodically determine whether any monitor items are due or about to become due and then prepare the appropriate notifications of same, if any.

Figure 20:
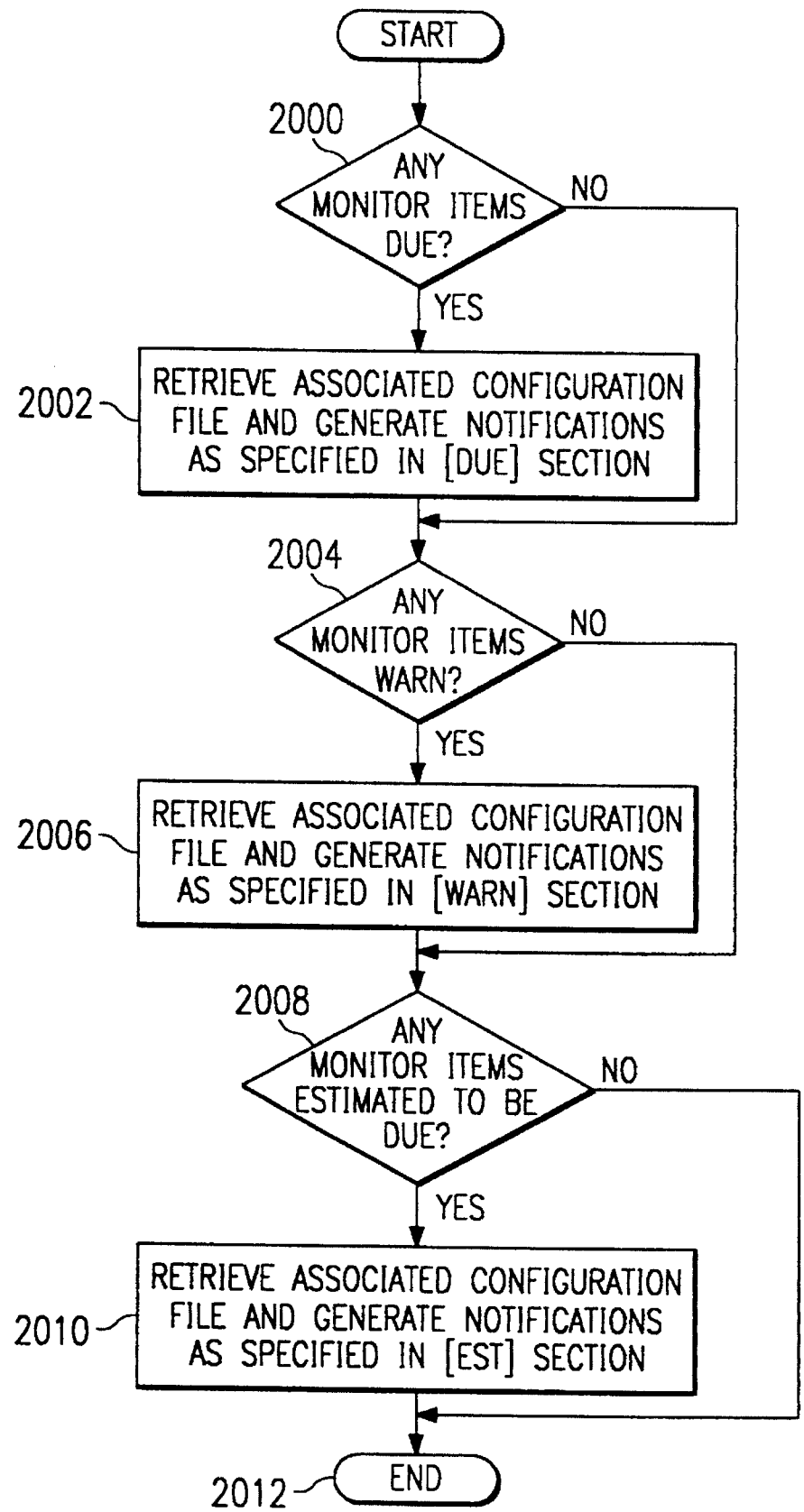

Accordingly, referring to FIG. 20, in step 2000, the utility 14 checks the files in the database 28 to determine whether any monitor items are DUE. If so, execution proceeds to step 2002, in which the utility accesses the appropriate configuration file from the database 30 and generates notifications in the manner specified in the [DUE] section, as described above. For example, the [DUE] section may indicate that the entity associated with the monitor item is to be logged down and that a VAX mail 35 message is to be sent to a supervisor in charge of the area in which the entity is located so that the appropriate action can be taken and the entity logged back up. Execution then proceeds to step 2004. If in step 2000, it is determined that no monitor items are DUE, execution proceeds directly to step 2004.

In step 2004, a determination is made whether any monitor items are designated "WARN," indicating that the item will become due within the specified warning interval. If so, execution proceeds to step 2006, in which, similar to step 2002, the appropriate configuration file is retrieved and the utility 14 generates notifications as specified in the [WARN] section of the file. Execution then proceeds to step 2008. If in step 2004 it is determined that no monitor items are designated "WARN," execution proceeds directly to step 2008.

In step 2008, a determination is made whether any monitor items are estimated to be due within the specified warning interval. As previously indicated, only those items which are performed responsive to events other than the elapse of time will need to be estimated. If in step 2008, it is determined that a monitor item is estimated to be due within the specified time period, execution proceeds to step 2010, in which the associate configuration file is retrieved from the database 30 and the utility 14 generates notifications as specified in the [EST] section of the file. Execution then ends in step 2012. Similarly, if in step 2008 it is determined that a monitor item is not estimated to be due within the specified time period, execution proceeds directly to step 2012.

It should be understood that the frequency with which the utility 14 checks for "DUE" and "WARN" items, and therefore, the frequency with which the flowchart illustrated in FIG. 20 is executed, is, at least in part, dictated by the frequency with which monitor items are to be performed. In other words, if a particular monitor item is to be performed at a particular time every 24 hours, the utility 14 will most likely check for "DUE" and "WARN" items hourly.

It is understood that the present invention can take many forms and embodiments. The embodiments shown herein are intended to illustrate rather than to limit the invention, it being appreciated that variations may be made without departing from the spirit of the scope of the invention. For example, the monitor utility 14 may be modified to be run on a PC based system, rather than the computer 12. In addition, data for updating the utility files may be from any source, so long as the data is capable of being transformed into a fiat file stored in the database 34. Moreover, it should be apparent that the VT 22 and keyboard 24 and the VT 16 and keyboard 18 may comprise the same VT and keyboard in certain embodiments of the invention. It should also be apparent that the value of this invention is not limited to semiconductor fabrication facilities in particular, nor to manufacturing facilities in general.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of operating a computer system to monitor, track and schedule monitor items associated with at least one entity employed in a manufacturing facility, the method comprising the steps of:

receiving data regarding performance of events in connection with an entity from a first input source;

updating a current status of each of said monitor items using said first input source data;

determining whether at least one of said monitor items is due;

responsive to a determination that at least one of said monitor items is due, notifying a designated user;

determining whether at least one of said monitor items will become due within a user-selected warning interval;

responsive to a determination that at least one of said monitor items will become due within said user-selected warning interval, issuing a warning to designated users via electronic mail; and generating a report showing said current status of only user-selected ones of said monitor items.

2. The method of claim 1 wherein said first input source comprises a video terminal (VT) and associated keyboard.

3. The method of claim 1 further comprising, for at least one of said monitor items:

prompting a user to specify a due date and time for said monitor item;

periodically comparing said user-specified due date and time with a current date and time;

wherein when said user-specified due date and time are respectively equal to said current date and time, said monitor item is due.

4. The method of claim 1 further comprising, for at least one of said monitor items:

prompting a user to specify an event and a number of times said event is to be performed before said monitor item is due;

counting a number of occurrences of said user-specified event;

wherein when said counted number of occurrences equals said user-specified number, said monitor item is due.

5. The method of claim 1 wherein said determining whether at least one of said monitor items is due further comprises, for at least one of said monitor items:

comparing a user-specified due date and time for said monitor item with a current date and time; and responsive to a determination that said user-specified due date and time and said current date and time are the same, indicating that said monitor item is due.

6. The method of claim 1 wherein said determining whether at least one of said monitor items is due comprises, for at least one of said monitor items:

counting a number of times an event specified by a user occurs;

comparing said counted number with a user-specified number; and responsive to a determination that said counted number and said user-specified number are the same, indicating that said monitor item is due.

7. The method of claim 1 wherein said first input source comprises a database associated with a management execution system (MES).

8. The method of claim 7 further comprising, responsive to at least one of said monitor items being due, logging said entity down in said MES database.

9. The method of claim 7 further comprising receiving data regarding said current status of said monitor items from a user-operated video terminal and associated keyboard.

10. A method of operating a computer system to monitor, track and schedule monitor items associated with an entity, the method comprising the steps of:

receiving data regarding performance of events in connection with said entity from a first input source;

updating a current status of each of said monitor items using said first input source data;

determining whether at least one of said monitor items is due;

responsive to a determination that at least one of said monitor items is dues notifying a designated user;

determining whether at least one of said monitor items will become due within a user-selected warning interval;

responsive to a determination that at least one of said monitor items will become due within said user-selected warning interval, warning a designated user; and responsive to at least one of said monitor items being due, periodically generating a warning to a designated user until said at least one of said monitor items that is due is performed.

11. Apparatus for monitoring, tracking and scheduling monitor items associated with at least one entity employed in a fabrication facility, the apparatus comprising:

means for receiving data regarding performance of events in connection with an entity from a first input source;

means for updating a current status of each of said monitor items using said first input source data;

means for determining whether at least one of said monitor items is due;

means responsive to a determination that at least one of said monitor items is due for notifying a designated user;

means for determining whether at least one of said monitor items will become due within a user-selected warning interval;

means responsive to a determination that at least one of said monitor items will become due within said user-selected warning interval for issuing a warning to designated users via electronic mail; and means for generating a report showing said current status of only user-selected ones of said monitor items.

12. The apparatus of claim 11 wherein said first input source comprises a video terminal (VT) and associated keyboard.

13. The apparatus of claim 11 further comprising:

means for prompting a user to specify a due date and time for at least one of said monitor items;

means for periodically comparing said user-specified due date and time with a current date and time;

wherein, for each of said at least one of said monitor items, when said user-specified due date and time are respectively equal to said current date and time, said monitor item is due.

14. The apparatus of claim 11 further comprising:

means for prompting a user to specify an event and a number of times said event is to be performed before at least cue of said monitor items is due;

means for counting a number of occurrences of said user-specified event;

wherein, for each of said at least one of said monitor items, when said counted number of occurrences equals said user-specified number, said monitor item is due.

15. The apparatus of claim 11 wherein said first input source comprises a database associated with a management execution system (MES).

16. The apparatus of claim 15 further comprising means responsive to at least one of said monitor items being due for logging said entity down in said MES database.

17. The apparatus of claim 15 further comprising means for receiving data regarding said current status of said monitor items from a user operated video terminal and associated keyboard.

18. Apparatus for monitoring, tracking and scheduling monitor items associated with an entity, the apparatus comprising:

means for receiving data regarding performance of events in connection with said entity from a first input source;

means for updating a current status of each of said monitor items using said first input source data;

means for determining whether at least one of said monitor items is due;

means responsive to a determination that at least one of said monitor items is due for notifying a designated user;

means for determining whether at least one of said monitor items will become due within a user-selected warning interval;

means responsive to a determination that at least one of said monitor items will become due within said user-selected warning interval for warning a designated user; and means responsive to at least one of said monitor items being due for periodically generating a warning to a designated user until said at least one of said monitor items that is due is performed.

19. Apparatus for monitoring, tracking and scheduling monitor items associated with at least one entity employed in a fabrication facility, the apparatus comprising:

a database for storing a plurality of data files, each of said data files comprising data regarding performance of events in connection with an entity entered from a first input source;

a monitor utility for updating a current status of each of said monitor items using said data, said monitor utility further comprising:

logic for determining whether at least one of said monitor items is due;

logic for determining whether at least one of said monitor items will become due within a user-selected warning interval; and logic for generating a report showing the current status of only user-selected ones of said monitor items;

wherein responsive to a determination that at least one of said monitor items said monitor utility notifies a designated user via electronic mail;

wherein responsive to a determination that at least one of said monitor items will become due within said user-selected warning interval, said monitor utility issues a warning to designated users via electronic mail; and wherein responsive to a determination that a user has requested said report, said monitor utility causes said report to be presented to said user in at least one of a plurality of user-selectable formats, including a display format and a print format.

20. The apparatus of claim 19 wherein said first input source comprises a video terminal (VT) and associated keyboard.

21. The apparatus of claim 19 wherein said first input source comprises a sensor operatively connected to said entity.

22. The apparatus of claim 19 further comprising a VT and associated keyboard connected to said monitor utility for updating said current status of said monitor items.

23. The apparatus of claim 19 wherein said monitor utility further comprises:

logic for prompting a user to specify a due date and time for at least one of said monitor items;

logic for periodically comparing said user-specified due date and time with a current date and time;

wherein, for each of said at least one of said monitor items, when said user-specified due date and time are respectively equal to said current date and time, said monitor item is due.

24. The apparatus of claim 19 wherein said monitor utility further comprises:

logic for prompting a user to specify an event and a number of times said event is to be performed before at least one of said monitor items is due;

logic for counting a number of occurrences of said user-specified event;

wherein, for each of said at least one of said monitor items, when said counted number of occurrences equals said user-specified number, said monitor item is due.

25. The apparatus of claim 19 further comprising a server electrically connected to said monitor utility and said database and responsive command received from said monitor utility for converting said database data files from a first format in which said database data files are stored in said database to a second format useable by said monitor utility.

26. The apparatus of claim 25 wherein said second format is an ASCII file format.

27. The apparatus of claim 19 wherein said database is associated with management execution system (MES).

28. The apparatus of claim 27 wherein said ME S is WORKSTREAM.

29. The apparatus of claim 27 wherein means responsive to at least one of said monitor items being due, said monitor utility logs said entity down in said MES database.

30. Apparatus for monitoring, tracking and scheduling monitor items associated with at least one entity employed in a fabrication facility, the apparatus comprising:

a database for storing a plurality of data files, each of said data files comprising data regarding performance of events in connection with an entity entered from a first input source;

a monitor utility for updating a current status of each of said monitor items using said data, said monitor utility further comprising:

logic for determining whether at least one of said monitor items is due;

logic for determining whether at least one of said monitor items will become due within a user-selected warning interval; and logic for generating a report showing the current status of only user-selected ones of said monitor items;

wherein responsive to a determination that at least one of said monitor items said monitor utility notifies a designated user via electronic mail;

wherein responsive to a determination that at least one of said monitor items will become due within said user-selected warning intervals said monitor utility issues a warning to a designated user via electronic mail;

wherein responsive to a determination that a user has requested said report, said monitor utility causes said report to be presented to said user in at least one of a plurality of user-selectable formats, including a display format and a print format; and wherein responsive to at least one of said monitor items being due, said monitor utility periodically generates a reminder to a designated user via electronic mail until said at least one of said monitor items that is due is performed.

* * * * *

UNITED STATES PATENT AND TRADEMARK OFFICE
CERTIFICATE OF CORRECTION

PATENT NO.    : 5,548,535
DATED         : August 20, 1996
INVENTOR(S)   : Zvonar It is certified that error appears in the above-identified patent and that said Letters Patent is hereby corrected as shown below:

<u>Title page,</u>
Item [57], ABSTRACT,
Line 6, "activities. erformed" should read -- activities. Performed --.

<u>Column 1,</u>
Line 38, "imperative accurately to" should read -- imperative to accurately --.
Line 45, "enables s user" should read -- enables a user --.

<u>Column 3,</u>
Line 5, after "event" please insert -- , --.

<u>Column 4,</u>
Line 19, "FIG. 6A" should read -- FIGS. 6A --.

<u>Column 6,</u>
Line 35, "FIG. 6A" should read -- FIGS. 6A --.

<u>Column 8,</u>
Line 21, "clockd," should read -- clocked, --.

<u>Column 10,</u>
Line 61, "an" should read -- a --.

<u>Column 13,</u>
Line 47, after "will" please insert -- be --.
Line 52, in both instances "rime" should read -- time --.

<u>Column 14,</u>
Line 1, "signalled" should read -- signaled --.

<u>Column 16,</u>
Line 44, "dues" should read -- due --.

UNITED STATES PATENT AND TRADEMARK OFFICE
CERTIFICATE OF CORRECTION

PATENT NO.   : 5,548,535
DATED        : August 20, 1996
INVENTOR(S)  : Zvonar

It is certified that error appears in the above-identified patent and that said Letters Patent is hereby corrected as shown below:

Column 20,
Line 7, "intervals" should read -- interval --.

Signed and Sealed this

First Day of October, 2002

Attest:

Attesting Officer

JAMES E. ROGAN
Director of the United States Patent and Trademark Office